United States Patent [19]

Miller et al.

[11] Patent Number: 4,989,686
[45] Date of Patent: Feb. 5, 1991

[54] SYSTEM FOR CONTROLLING TORQUE TRANSMISSION IN A FOUR WHEEL DRIVE VEHICLE

[75] Inventors: Alan L. Miller, Ithaca, N.Y.; James J. Coogan, Des Plaines; Scott R. Anderson, LaGrange, both of Ill.; James Kozlowski, Whiting, Ind.

[73] Assignee: Borg-Warner Automotive, Inc., Sterling Heights, Mich.

[21] Appl. No.: 365,530

[22] Filed: Jun. 13, 1989

Related U.S. Application Data

[63] Continuation-in-part of Ser. No. 216,044, Jul. 7, 1988, abandoned.

[51] Int. Cl.$^5$ ............................................. B60K 17/344
[52] U.S. Cl. ........................................ 180/197; 74/866; 180/248; 364/426.03; 475/150
[58] Field of Search ............... 180/247, 248, 249, 250, 180/197; 74/705, 710, 710.5, 711; 364/426.03

[56] References Cited

U.S. PATENT DOCUMENTS

| | | | |
|---|---|---|---|
| 3,627,072 | 12/1971 | Smirl | 180/249 |
| 3,894,446 | 7/1975 | Snoy et al. | 74/711 |
| 3,915,023 | 10/1975 | Ottemann | 74/711 |
| 3,923,113 | 12/1975 | Pagdin | 180/249 |
| 4,343,205 | 8/1982 | Dzida | 74/711 |
| 4,601,359 | 7/1986 | Weismann et al. | 180/248 |
| 4,644,823 | 2/1987 | Mueller | 180/248 |

Primary Examiner—Charles A. Marmor
Assistant Examiner—Eric Culbreth
Attorney, Agent, or Firm—Reising, Ethington, Greg Dziegielewski, et al

[57] ABSTRACT

A control system for a full time four wheel drive vehicle having a transfer case including a planetary gear differential and an electromagnetically actuated clutch assembly for biasing torque between the front and rear drive wheels in response to signals from the control system. The control system includes apparatus for detecting wheel slip and a device, responsive to the detection of wheel slip for calculating a maximum torque level to be established by the clutch assembly as a function of the total torque delivered to the transfer case and for programming clutch torque application over a predetermined time period and in a manner biasing torque through the differential to eliminate wheel slip.

62 Claims, 11 Drawing Sheets

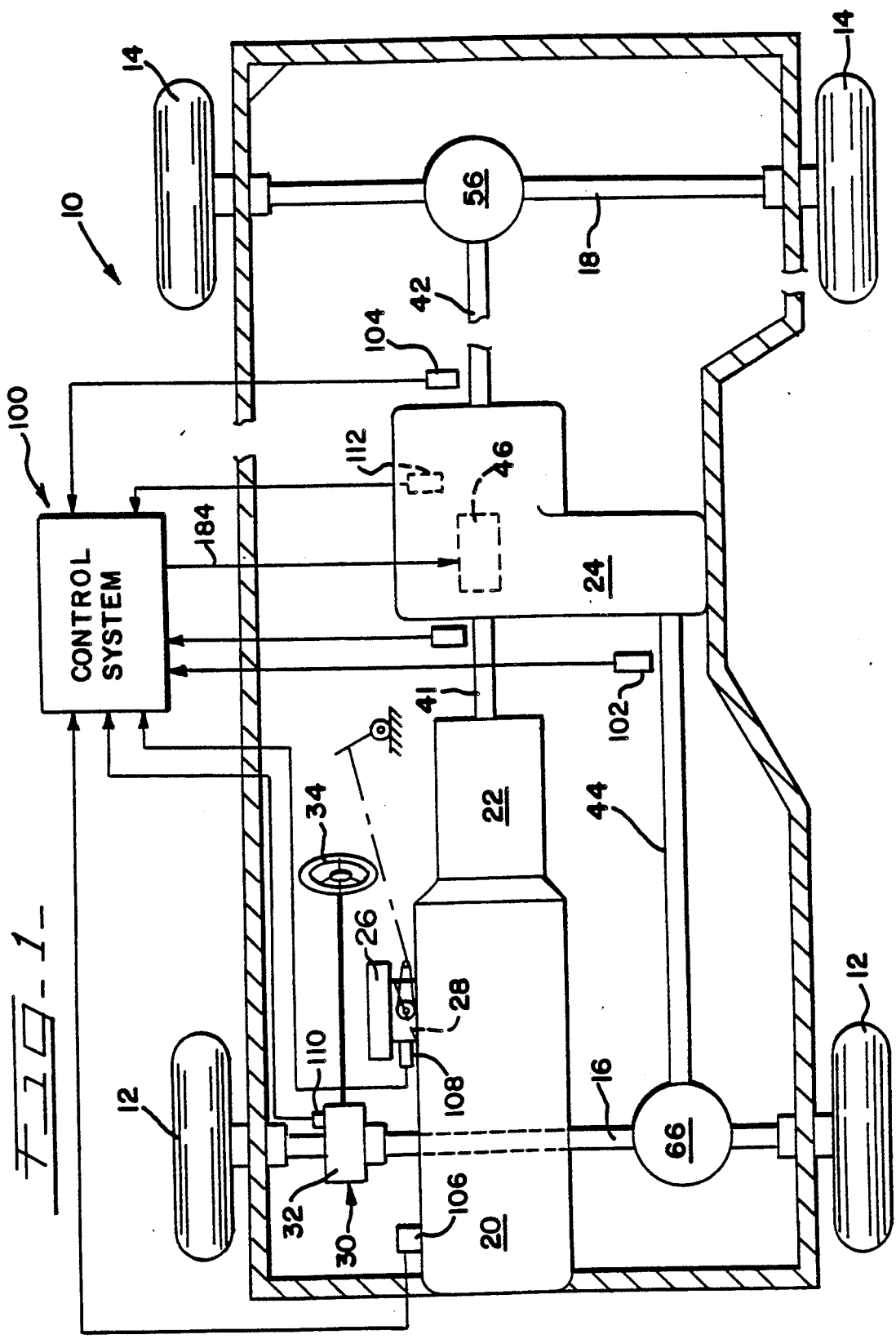

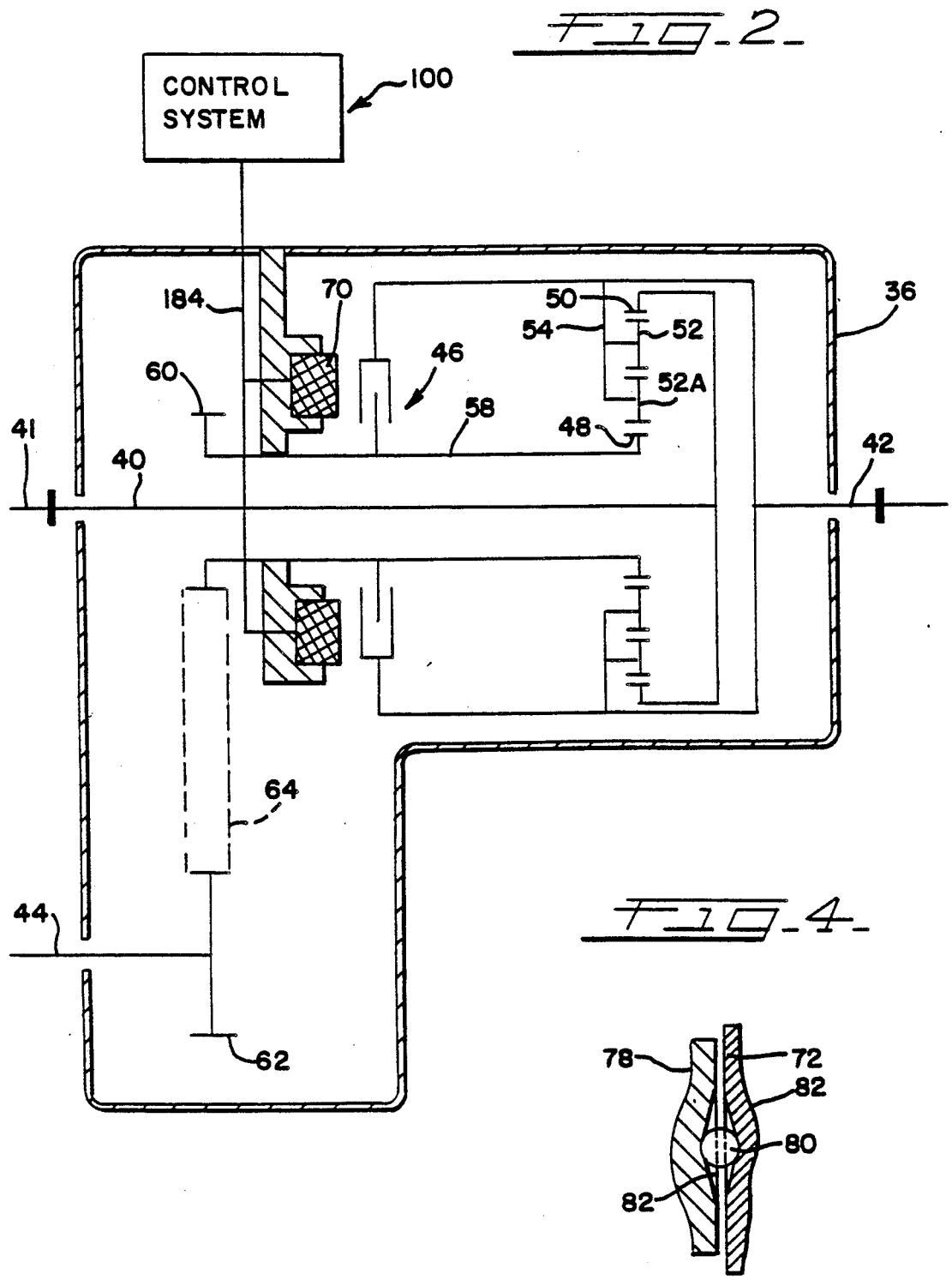

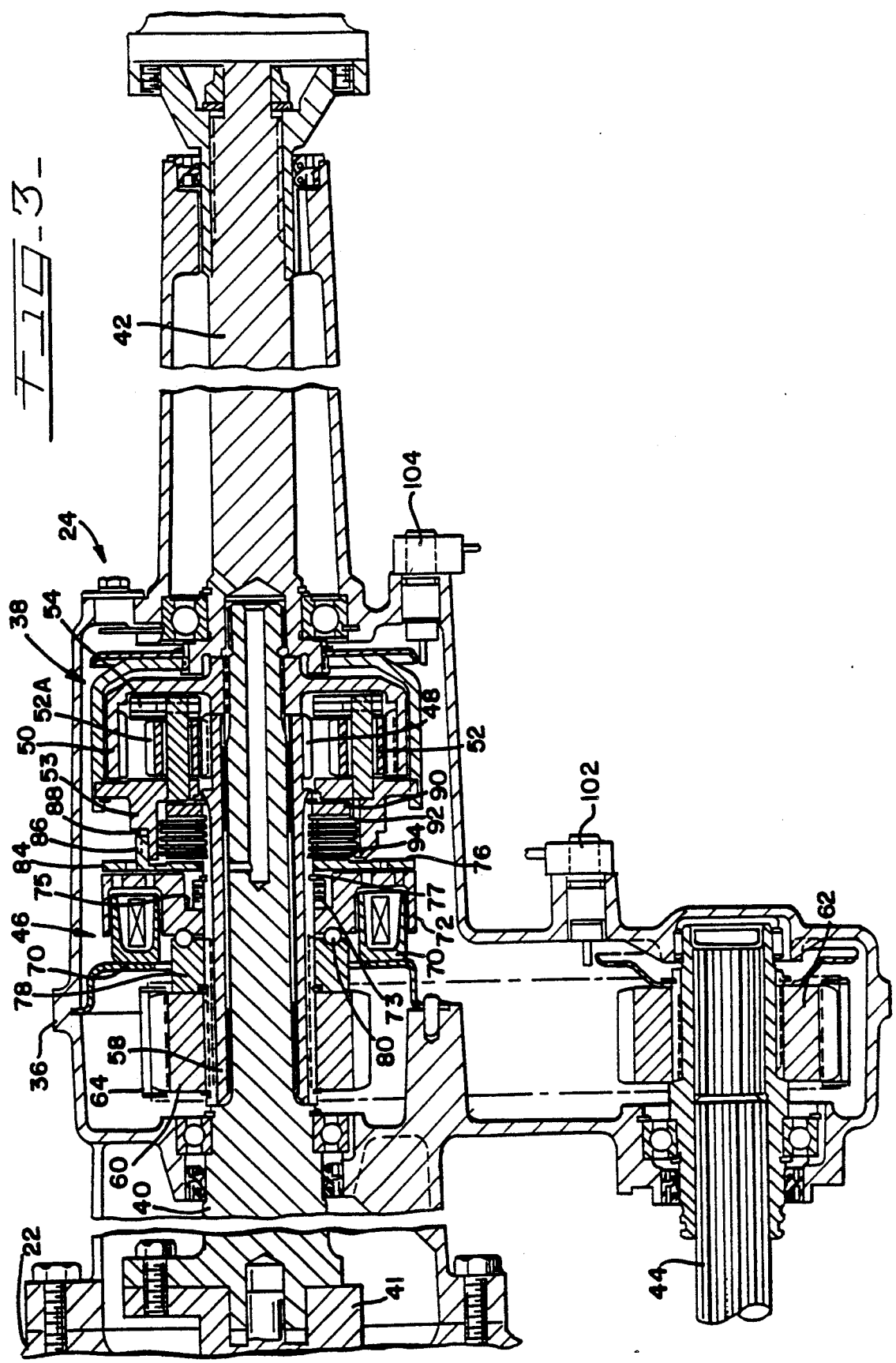

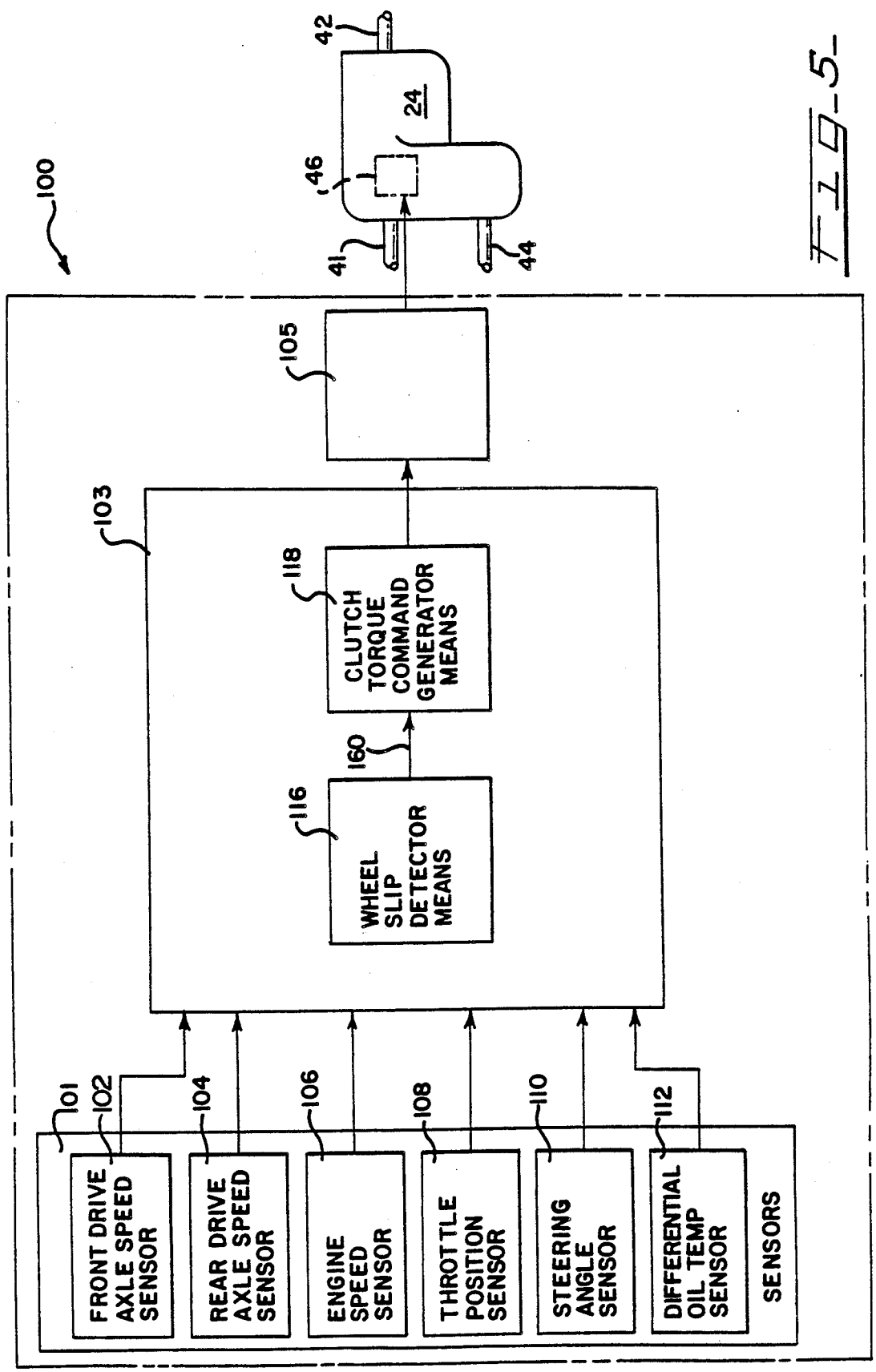

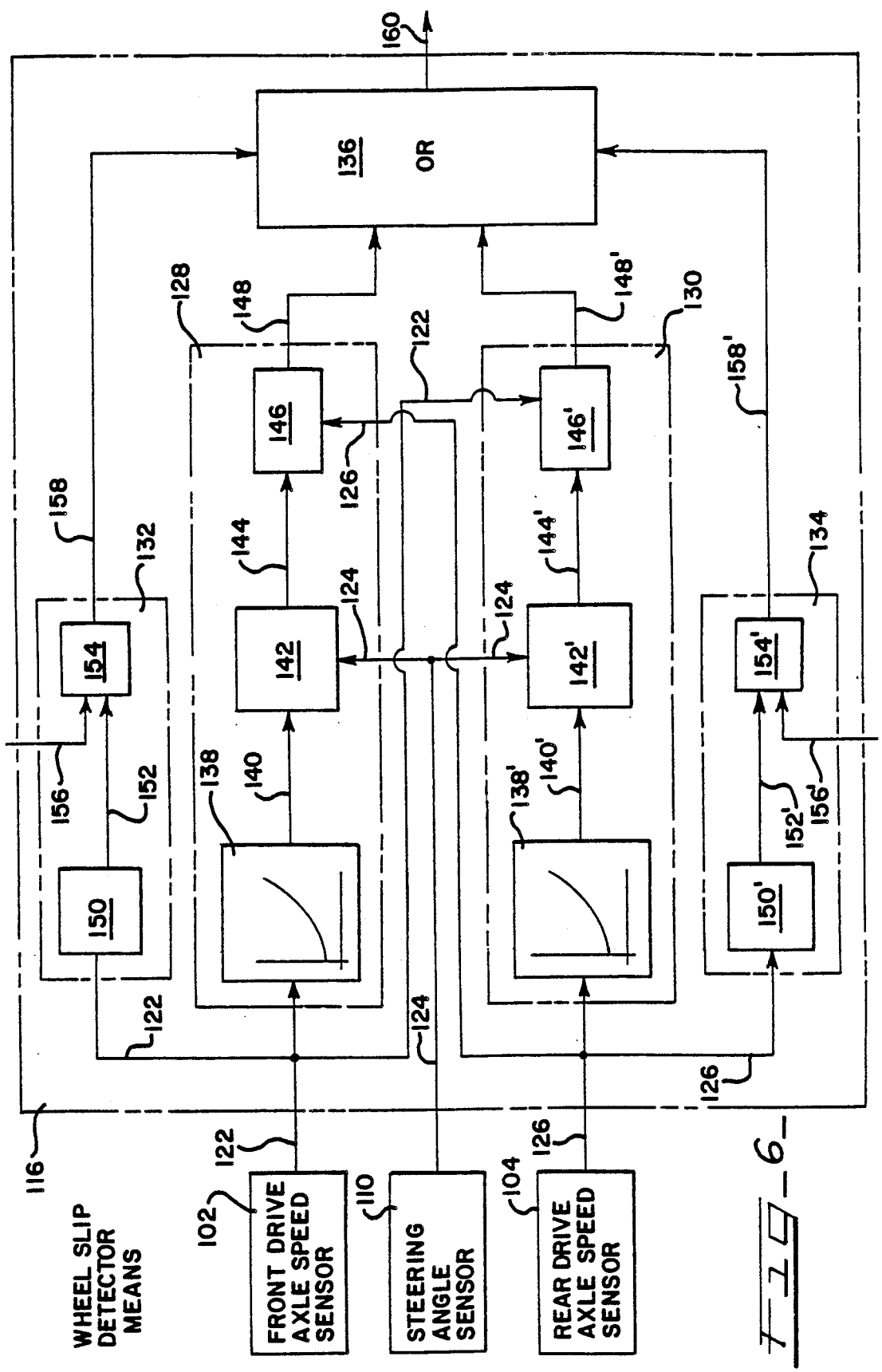

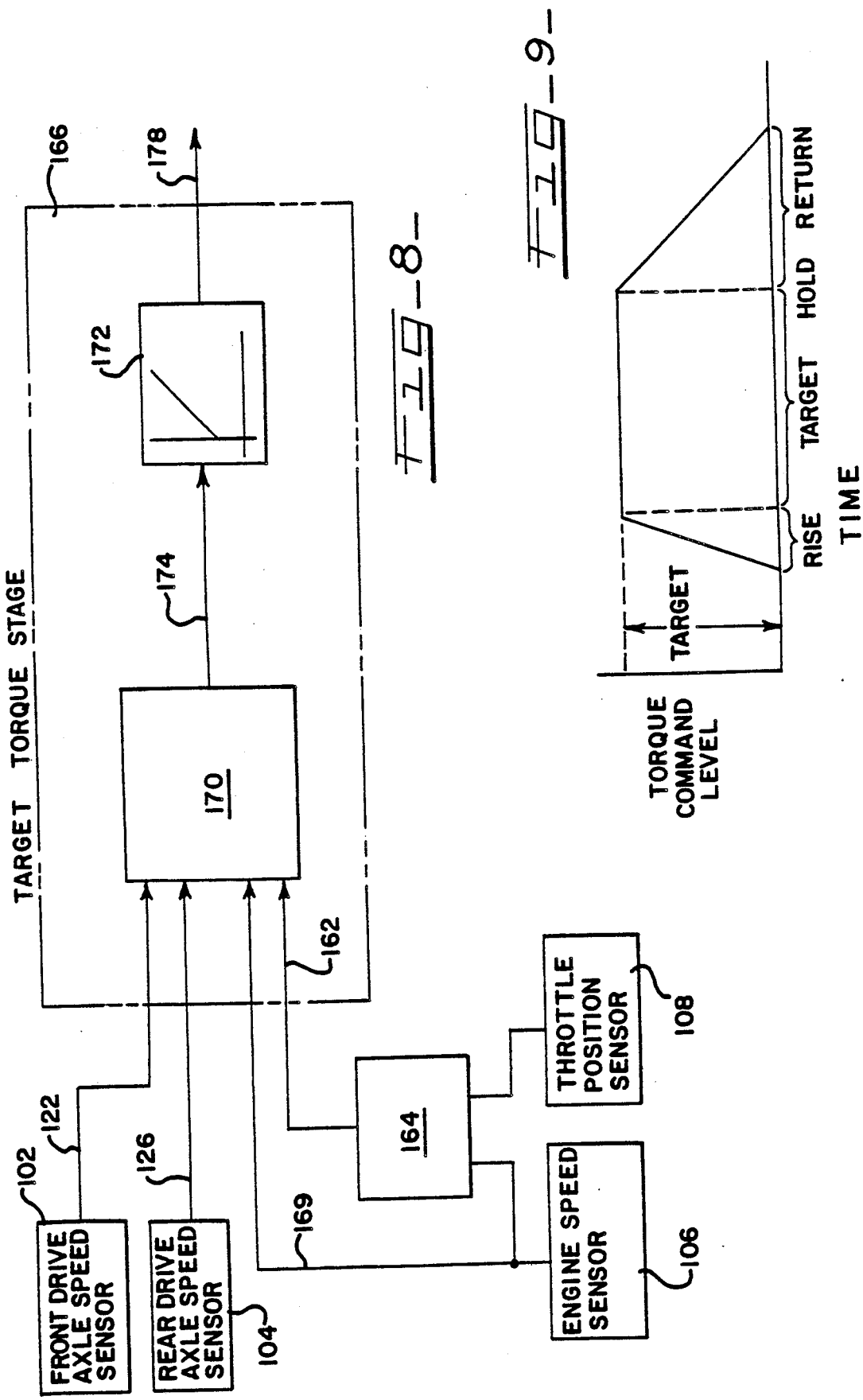

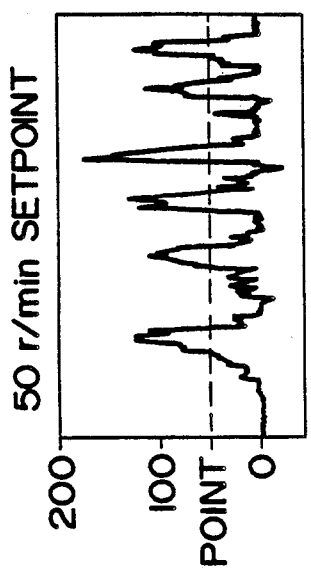
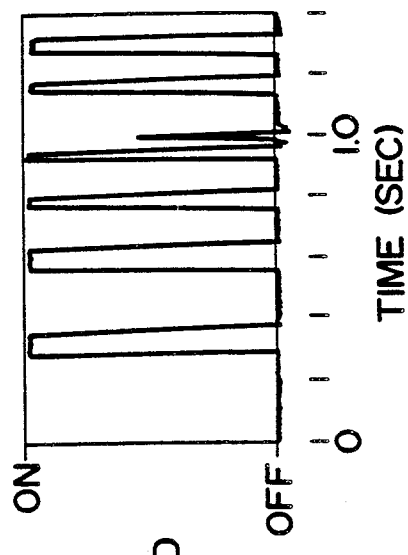
FIG 15
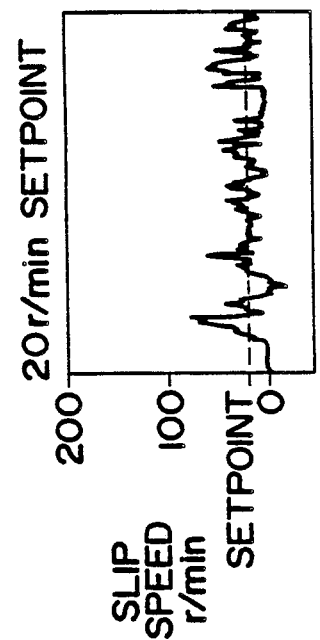
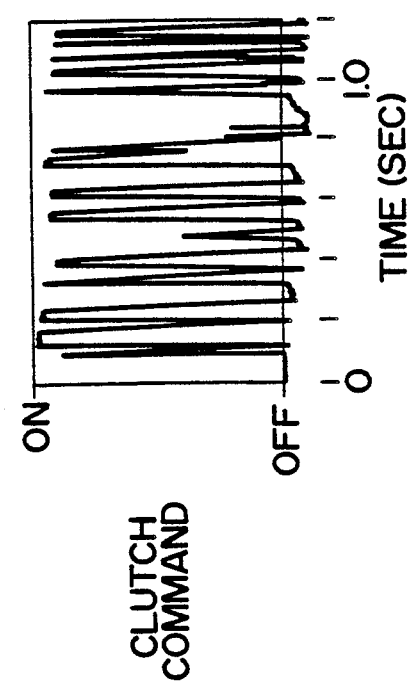
FIG 14

SYSTEM FOR CONTROLLING TORQUE TRANSMISSION IN A FOUR WHEEL DRIVE VEHICLE

This is a continuation-in-part application of U.S. Ser. No. 216,044 filed July 7, 1988, now abandoned.

FIELD OF THE INVENTION

This invention relates to a system for controlling torque transmission in a four wheel drive vehicle and is particularly applicable for vehicles having a clutch controlled differential mechanism for dividing torque between two output shafts.

BACKGROUND OF THE INVENTION

Four wheel drive vehicles having a transfer case in the driveline for distributing power to the front and rear drive axles are known in the art. In such vehicles, the transfer case is usually provided with two or more output shafts which are driven by a main or input shaft. The driven shafts may be referred to as output drive shafts since they are used to drive the vehicle road wheels through the drive axles. Some differential in the speed between the shafts is necessary to permit different rotational speeds of the driving wheels to accommodate vehicle steering. It is known to couple these output shafts by means of a differential. In some applications, a bevel gear differential, which evenly splits the torque between the drive axles, is used in the transfer case to drive the front and rear axles at all times, yet allow relative rotation between the axles to accommodate steering geometry. The use of a gear differential in a drive train has one serious drawback. That is, if any road wheel of the vehicle is on a low traction surface, the various axle and transfer case differentials allow that wheel to turn freely. As such, little power or torque is delivered to the remaining wheels.

To minimize wheel slippage, the transfer case differential is sometimes equipped with a manually operated lock-up mechanism. Such a mechanism is operated in either a locked or unlocked condition. When locked, such a mechanism connects the front and rear drive shafts together and positively drives them both. Such a locking mechanism does not allow, however, any differentiation between front and rear drive axle turning speeds.

Several systems have been devised to automatically shift a vehicle from two wheel drive to four wheel drive. With such systems, the front and rear drive wheels are locked together upon the detection of wheel slip. Those systems which automatically shift between two and four wheel drive have several drawbacks. First, such systems do not offer full-time four wheel drive. Thus, the improved vehicle handling and safety characteristics obtainable with full time four wheel drive cannot be achieved with such systems. Second, those systems which automatically shift between open or locked states lack flexibility. Once the system locks the front and rear drive wheels, no speed differential can be incurred therebetween. In many instances (i.e., cornering) it is desirable to shift torque from one drive shaft to the other while allowing speed differences between them. Furthermore, in those instances where a two wheel drive is automatically transmuted into four wheel drive in response to wheel slip, the automatic lock-up characteristic may cause the previously gripping set of wheels to loose traction. Thus, a need remains for a system wherein torque between front and rear drives may be shifted at something less than full lock-up.

There are also those systems which shift a four wheel drive vehicle to two wheel drive in response to a steering sensor. Again, such systems operate in either a locked or unlocked condition. Such systems do not afford the benefits of full-time four wheel drive. In many instances, including cornering, it is desirable to be able to control the torque split between the front and rear wheels. The heretofore known systems do not and cannot offer such abilities.

SUMMARY OF THE INVENTION

Starting with these known devices, the task of the present invention resides in the provision of a system which provides continuous or full-time four wheel drive. Unlike other known systems, the present invention includes means for controlling torque distribution between the front and rear wheels in response to vehicle operation.

Generally stated, the present invention provides a system which combines a gear drive having a modulatable clutch mechanism and a control arrangement which modulates or regulates clutch operation to change or modify torque distribution between the front and rear drive axles of a vehicle. More specifically, the present invention includes a transfer case having an input shaft connected to the engine and two power output shafts for driving the front and rear pairs of road wheels. A differential gear arrangement is interposed between the input and output shafts. The gear arrangement includes at least three members which form a gear train. The normal torque delivered to the output shafts will be of a fixed proportion or ratio determined by the gear geometry of the gear train. An electromagnetically actuated clutch mechanism, operably disposed between the output shafts, is provided to bias the torque distribution to the wheels of the vehicle. In its presently preferred form, the clutch assembly includes frictionally engageable members for interconnecting two of the differential components or members such that the relative rotation between the output shafts is controlled by a torque level established between the friction members. In operation, the biasing clutch adds driving torque to the slowest turning output shaft and subtracts torque from the fastest turning output shaft in an amount equal to the torque capacity of the clutch. The degree of clutch torque capacity may be modulated from completely free to that equivalent to dry pavement wheel skid torque.

The ability to control or modulate the torque level of the biasing clutch is achieved through a unique electronic control system. The electronic control system generally includes a sensor stage, a computing stage, and an actuating stage. The sensor stage includes a series of sensors. The computing stage is interconnected with the sensor stage and develops an output in response to the detection of wheel slip. The output of the computing stage is delivered to the actuator stage. The output of the actuator stage controls the biasing clutch mechanism and thereby the torque split between the drive axles of the vehicle.

The sensor stage of the control system includes a plurality of sensors which monitor vehicle characteristics and provide output signals indicative thereof. The computing stage of the control system includes means for detecting wheel slip and for developing an output indicative thereof. The computing stage further includes means for calculating a maximum torque level to be established by the clutch assembly as a calculated function of the total torque delivered to the transfer case and means, responsive to the detection of wheel slip, for programming clutch torque application over a predetermined time period. The output of the computing stage is delivered to the actuator stage of the control system to regulate the level of clutch energization in a manner biasing torque between the front and rear drive axles. The ability to bias torque to a particular or desired level improves traction control and opens up a new area of programmable vehicle handling characteristics.

Accordingly, a primary object of this invention is to eliminate the disadvantages of the prior art by providing a control system which allows full time four wheel drive and is capable of biasing torque to each drive axle of the vehicle at a particular or desired level to improve traction control.

An important advantage of this invention is that it allows the clutch application to be modulated in a manner biasing the torque to all four wheels and in a manner whereby improving vehicle handling and safety characteristics.

It is another object of this invention to provide a new and improved control system for four wheel drive vehicles which will sense both wheel slip and steering angle and will modify the torque distribution to each drive axle accordingly.

A further object of the present invention is to provide a microprocessor based control system having a vehicle handling strategy module including means for storing a function comparing vehicle operating conditions versus a desired slip speed setpoint for different vehicle operating conditions the vehicle handling strategy module measures actual vehicle operating conditions and analyzes the actual vehicle operating conditions with the function to produce a desired slip speed setpoint to which actual vehicle operating conditions are to be controlled; a feedback control loop means is also provided including means for comparing the desired slip speed setpoint with the actual slip speed between the front and rear drive shafts of a four-wheel drive vehicle to produce an error signal controlling an electromagnetically energizable clutch to vary the torque split between the front and rear drive axles of the four-wheel drive vehicle so as to move the torque split from the rear to the front axle to improve traction and vehicle handling conditions.

Still another object of the present invention is to provide such a feedback control loop means in which the slip speed error signal is further modulated by a feed forward signal generated by the vehicle handling strategy module in accordance with actual vehicle operating conditions.

Yet another object of the present invention is to provide a four-wheel drive control having such a vehicle handling strategy module and such a feedback control loop module wherein the clutch torque control signal is established by switching logic producing a limit cycle output the frequency of which is established by the dynamics of the overall system.

Still another object of the present invention is to provide a control output established by either a bang bang control law, pulse width modulation, control based on the feedback signal or a proportional integrated differentiation control based on the feedback signal.

BRIEF DESCRIPTION OF THE DRAWINGS

Having in mind the above objects and other attendant advantages that would be evident from an understanding of this disclosure, the invention comprises the devices, combination and arrangement of parts as illustrated in the presently preferred form of the invention which is hereinafter set forth in detail to enable those skilled in the art to readily understand the function, operation, construction and advantages of same when read in conjunction with the accompanying drawings in which:

FIG. 1 is a schematic showing of a vehicle to which the present invention is applied;

FIG. 2 is a schematic view of the transfer case of this invention;

FIG. 3 is a cross-sectional view depicting additional structural details of one form of a transfer case useful with the present invention;

FIG. 4 is an enlarged sectional view of a ball ramp mechanism associated with the clutch assembly of this invention;

FIG. 5 is a block diagram of a control system constructed in accordance with the inventive teaching;

FIG. 6 is a block diagram detailing the presently preferred wheel slip detector stage of the control system:

FIG. 8 is a block diagram detailing another part of the computer stage of the control system;

FIG. 9 is a graphical representation useful in understanding the operation of the control system;

FIG. 14 shows comparative graphs of actual clutch command signals produced by the embodiment of FIG. 10 at a slip speed setpoint of 20 revolutions per minute; and FIG. 15 shows comparative graphs of actual clutch command signals for split speed setpoints of 50 revolutions per minutes.

DETAILED DESCRIPTION OF A PREFERRED EMBODIMENT

Figure 7:
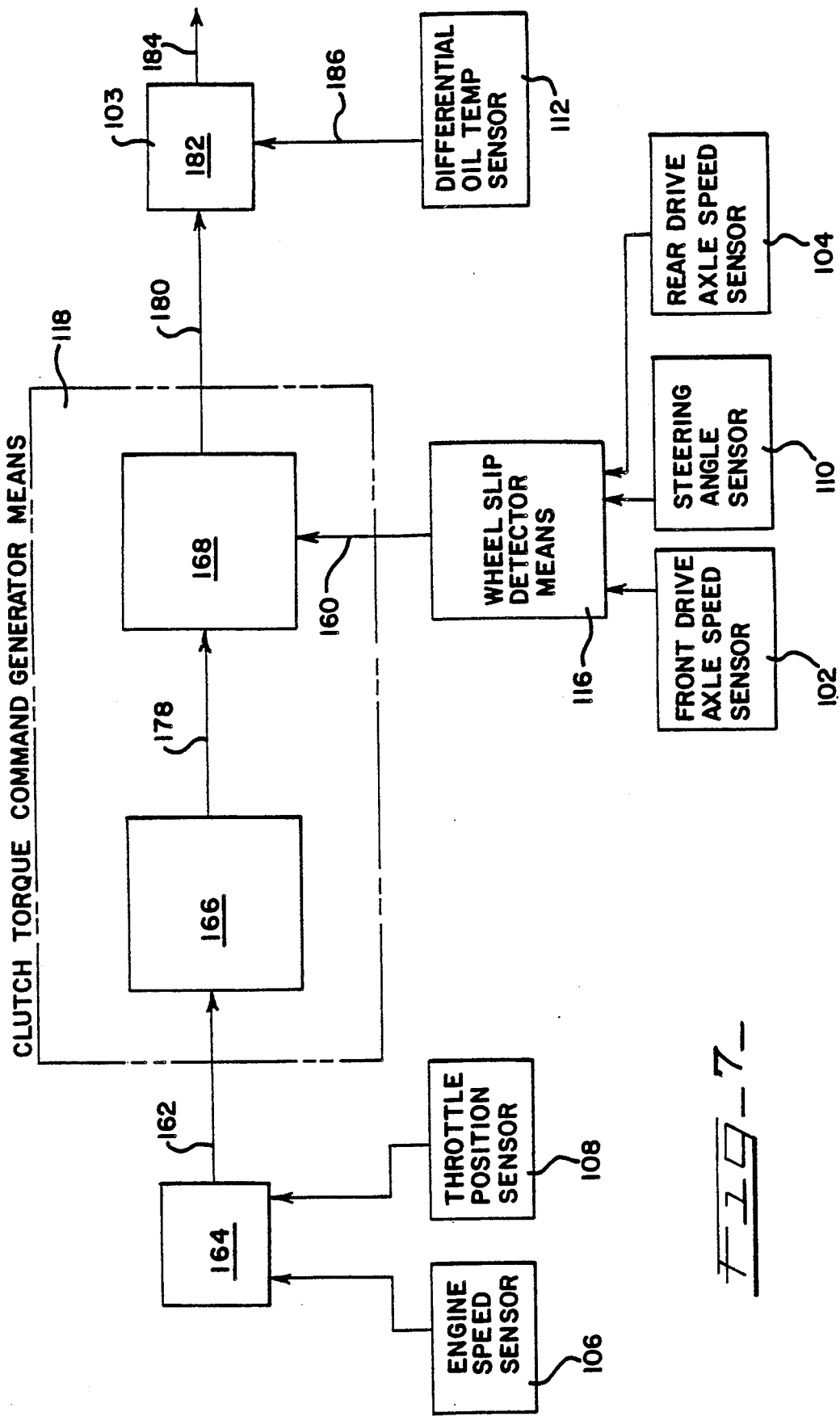
FIG. 7 is a block diagram detailing part of the presently preferred computer stage of the control system.

Referring now to the drawings, wherein like reference numerals indicate like parts throughout the several views, in FIG. 1 there is schematically illustrated a four wheel drive vehicle 10 having front and rear pairs of road wheels 12 and 14, respectively. The road wheels 12 and 14 are mounted on front and rear drive axle means 16 and 18, respectively. The vehicle 10 is further provided with a power train assembly including a power source or engine 20 whose output is transmitted to each drive axle means through a transmission 22 and a drive transfer unit 24 having a center or interaxle differential unit. The engine 20 is provided with a carburetor 26 having a spindle mounted valve 28 for regulating the air intake to the induction passage of the carburetor wherein an intake manifold vacuum develops. The vehicle may further include steering mechanism means 30. The steering mechanism means 30 includes a steering box 32 operatively connected to a steering wheel 34. With the exception of the transfer case, the purpose and operation of the other parts of the vehicle are well-known and, thus, no further details need be provided therefore.

As schematically illustrated in FIGS. 2 and 3, the components of the drive transfer unit 24 are housed in a separate fluid containing casing or housing 36 and comprise, generally, a gear drive or set 38, a rotatably mounted input drive shaft 40 which is connected to the transmission output shaft 41, two rotary mounted power output shafts 42 and 44, and operative means 46 in the form of an electromagnetic clutch assembly. In the preferred embodiment, the gear drive or set 38 is a center differential unit which includes a planetary gear set. For purposes of this disclosure, however, the terms, "differential" and "differential unit" mean a mechanical connection which divides torque between the front and rear wheels at a ratio determined by a selected gear arrangement.

The presently preferred planetary gear set 38 includes three sets of nested and relatively rotatable elements; namely, an externally toothed sun gear 48, an internally toothed annulus or ring gear 50, and twin pinion gears 52 and 52A which intermesh with one another and with the sun and ring gears 48 and 50, respectively. The pinion gears 52 and 52A are carried by a planet carrier 54. Depending on the torque transfer desired, any one of the three sets of elements may be connected to the power input shaft 40. In the illustrated embodiment, the sun gear 48 rotates about an axis of rotation thereof and is operably connected to drive output shaft 44. The ring gear 50 is rotatable about an axis of rotation substantially coaxial with the axis of rotation of the sun gear 48 and is operably connected to the input drive shaft 40. The planet carrier 54 of the differential turns about the axis of rotation of the sun gear and is operably connected to one end of the drive output shaft 42. By this construction, rotary motion of any one shaft effects rotary motion of the other two shafts in a predetermined timed relationship.

Drive output shaft 42 is coaxially mounted in the casing relative to the input shaft 40. As illustrated in FIG. 1, the other end of the rotary power output shaft 42 is connected to a rear differential unit 56. The rear differential unit 56 is connected to and drives the rear wheels 14 through the rear drive axle means 18. The rear differential unit 56 allows or permits the rear wheels to rotate at different speeds and absorbs rotational speed differences between the wheels.

Returning to FIGS. 2 and 3 in the illustrated embodiment, the sun gear 48 of the differential unit 38 is arranged on one end of a tubular sleeve shaft 58 which is telescopically mounted for rotation about the input drive shaft 40. Also carried on the sleeve shaft 58 is a first chain wheel 60. The first chain wheel 60 is connected with a second chain wheel 62 by suitable force transfer or chain means 64. The second chain wheel 62 is carried by the other power output shaft 44 of the differential unit. The second power output shaft 44 is spaced laterally from and extends parallel to the output shaft 42 and is rotatably supported in the casing or housing 36. As best illustrated in FIG. 1, the second output shaft 44 is connected to a front differential unit 66. The front differential unit 66 being operably connected to drive the front wheels 12 through the front drive axle means 16. The front differential unit 66 permits or allows the front wheels to rotate at different speeds and absorbs the rotational speed difference between the wheels.

As mentioned above, the transfer unit further includes a biasing clutch assembly 46 for modulating torque transfer through the center differential. That is, the biasing clutch assembly operationally adds to or subtracts from the torque delivered to the drive output shafts. In the preferred embodiment, and as illustrated in FIG. 3, the electromagnetic clutch assembly 46 is comprised of stationary magnetic coil means 70 suitably arranged within the housing 36 and which is partially surrounded by a soft iron rotor 72. As will be subsequently described, suitable electrical conduits or lines provide clutch current to the magnetic coil 70 to generate a magnetic flux. On one side, the rotor 72 is formed with a suitably slotted end face 76. A connecting sleeve or member 78 connected to shaft 58 is provided adjacent the opposite side of the rotor 72. As best illustrated in FIG. 4, the rotor 72 is coupled to the shaft 58 through a ball ramp coupling including a series of loosely movable locking balls 80 which are entrapped within a series of pockets defined by conically shaped recesses or ramps 82 (FIG. 4) provided on both the rotor 72 and the connecting sleeve 78. An important design aspect of this device is that the geometry of the ball/ramp design of the coupling mechanism is such that the clutch assembly is not self locking. This is necessary to ensure that the clutch will not self engage without application of an additional control input and ensures positive release or modulation capability upon removal or decreased control input.

One or more resilient springs 73 are provided to urge the rotor axially toward the connecting member or sleeve 78. Such springs are positioned between a radial surface 75 on the rotor 72 and a snap ring 77 on shaft 58. By this construction, the rotor 72 is automatically positioned to exert substantially no compressive force on the friction clutch when the electromagnet coil 70 is deenergized.

Returning to FIG. 3, the clutch assembly 46 further includes a suitably slotted armature or friction disc 84. The disc may be provided with recesses or teeth 86 which cooperate in a driving relationship with complementary recesses or teeth 88 provided on an extension 53 of the planet or pinion carrier 52. The disc 84 is capable of axial displacement relative to the shaft 58 and is arranged for friction engagement with the slotted end face 76 of the rotor 72. Axially spaced from the friction disc 84 and connected to the shaft 58 is an annular backing or pressure plate 90. Disposed between the backing plate 90 and the friction disc 84 is a set of mutually interleaved friction plates or discs 92 and 94 respectively associated with the extension 53 and the sleeve shaft 58.

In operation, the magnetic coil means 70 may be initially deenergized and no direct driving connection exists between the output shafts 42 and 44. As such, the torque split to each of the drive axles is determined by the gear geometry of the planetary gear set. Application of clutch current to the stationary coil means 70 generates a magnetic flux which causes the friction disc or armature 84 to be drawn toward the end face 76 of the rotor 72, thereby establishing a frictional driving connection between the rotor 72 and friction disc 84. Because friction disc 84 is operatively connected to the output shaft 42, it will turn at the same rotational speed thereof. Similarly, because the rotor 72 is operatively connected to output shaft 44, through the chain drive and shaft 58, it will turn at the same rotational speed as the output shaft 44. If relative motion exists between the power output shafts 42 and 44, such motion will cause the balls 80 to roll up on the conically shaped recesses 82. As such, the coupling mechanism will forceably and axially move the rotor 72 and friction disc 84, as an assembly, in a manner thereby pressing the friction plates 92 and 94 together with a compression force or wedge action. When pressed together, the friction plates 92 and 94 serve to transmit motive force between the output shafts 42 and 44. As such, the clutch will add torque to the slower turning of the two output shafts and subtract torque from the faster turning or running output shaft. By modulating the clutch current, the relative rotation of the output shafts 42 and 44 may be modulated. That is, with the coupling mechanism being designed to disengage under torque, there must be an additional torque supplied to the preliminary coupling to generate the required axial force for holding the friction plates 92 and 94 in engagement. This torque is supplied by the magnetic clutch assembly 46.

The level of clutch current supplied to the magnetic coil means 70 of the clutch assembly 46 controls the bias torque of the clutch assembly. That is, precise control over the torque bias can be achieved by increasing or decreasing the clutch current to coil 70. In accordance with the present invention, a control system or information processing unit 100 (FIG. 1) is provided for regulating the level of current supplied to the clutch assembly thereby controlling the torque bias between the front and rear drive axle means 44 and 42 respectively. Broadly stated and as may be best illustrated in FIG. 5, the control system 100 is comprised of a sensor stage 101, a computing or controller stage 103, and an actuator stage 105. The sensor stage 101 of the control system includes a series of sensors for monitoring or detecting various vehicle operating conditions. The computing or controlling stage 103 of the control system receives inputs from each of the sensors included in the sensor stage and develops an output which is calculated as a function of the total torque delivered to the transfer case 24. This output is delivered to the actuator stage 103 of the control system to regulate the level of clutch energization in a manner controlling the torque bias established between the front and rear drive axles 44 and 42, respectively. With this overall perspective of the control system, the details of each stage comprising the controlling system will now be described.

The sensor stage 101 of the control system includes a plurality of sensors 102, 104, 106, 108, 110 and 112 which monitor variable vehicle operating conditions. Typically, sensor 102 may be positioned (FIG. 3) to detect the rotational speed of drive shaft 44 and sensor 104 may be positioned (FIG. 3) to detect the rotational speed of drive shaft 42. The sensors 102 and 104 may be of conventional design such as magnetic sensors which provide an output pulse upon passage of each tooth of a gear or rotor secured to turn with the respective output shaft. As such, the frequency of each sensor signal is proportional to the rotational speed of the respective output shaft. Sensors 106 and 108 monitor engine operating conditions. Specifically, sensor 106 (FIG. 1) develops a signal indicative of the present engine speed. Sensor 108 (FIG. 1) may take the form of a potentiometer or other suitable device for detecting the load on the engine—as chosen by the operator—and for applying an output signal to the control system indicative of such load. Alternatively, sensors 106 and 108 could be replaced by a true torque sensor. Steering angle sensor 110 (FIG. 1) monitors the steering angle of the front road wheels 12 and produces a signal indicative of such condition. Furthermore, a differential oil temperature sensor 112 may be provided to monitor the temperature of the differential oil and in the fluid case 24 for developing an output signal indicative of same.

The output of the sensors act as inputs to the control or computing stage 103 of the control system. The computing stage 103 includes means for receiving input signals from the various sensor means and further includes analog and/or digital electronic calculation and logic circuitry, preferably microcomputers based.

The computing or controller stage 103 of the control system includes wheel slip detection means 116 and clutch torque command generator means 118. The object or purpose of the wheel slip detector means is to detect when any of the four road wheels has lost traction. The wheel slip detector means 116 includes means for receiving signals indicative of vehicle performance from the front and rear drive shaft speed sensors 102 and 104. In operation, the wheel slip detector means functions to compare the front and rear drive shaft rotational speeds against each other and as a function of the vehicle's steering angle. If the wheel slip detector means detects or computes inordinate wheel slip, an output or trigger signal is applied over line 160 to the clutch torque command generator means 118. An output produced over line 160 indicates that traction between the road wheels and the surface has been broken. In addition to the wheel slip indication received over line 160, the clutch torque command generator means line 160, uses engine data from the engine speed sensor 106 and throttle position sensor 108. The purpose of the clutch torque command generator means 118 is to develop a time dependent control output which is delivered to the actuator stage 105 of the control system for controlling or regulating energization of the electromagnetic clutch 46.

The wheel slip detector means 116 is provided with operative means capable of detecting when one or more of the road wheels has lost traction with the surface. As a skilled artisan may readily appreciate, such operative means may take many forms. The various and presently preferred functions of such operative means being illustrated in the block diagrams of FIG. 6. As illustrated therein, the wheel slip detection means 116 receives input data from three sensors. That is, the front shaft speed sensor 102, the steering angle sensor 110, and the rear shaft speed sensor 104 all provide inputs along lines 122, 124 and 126 respectively, to the Wheel slip detector means 116. In its preferred form, the slip detector 116 has two methods of detecting wheel slip. One is based on relative speed of the two output shafts 44 and 42. The other method of wheel slip detection is based on the acceleration of the individual drive shafts 44 and 42. To accomplish these ends, wheel slip detector means 116 includes four signal translation paths 128, 130, 132 and 134 all of which lead to an "OR" circuit 136. A wheel slip indication received by the "OR" circuit 136 from any one of the signal translation paths will produce an output signal indicative of wheel slip.

The first signal translation path 128 receives inputs from the front drive shaft sensor 102 over line 122. Inputs indicative of front drive shaft rotational speed are compared against preselected values at a comparison stage 138. At stage 138, the input from the sensor 102 is used to generate a maximum rear drive shaft speed limit. The output of stage 138 is delivered over line 140 and acts as an input to another computation stage 142. To allow for shaft speed differences which may be encountered in cornering maneuvers, another input over line 124, indicative of the present steering angle, is also provided to the computation stage 142. Computation stage 142 produces an output which is a theoretical computation of what the maximum turning rate of the rear wheel should be based on the present revolution rate of the front drive shaft 44 and the present steering angle. The output of computation stage 142, which indicates how fast the rear wheels should be turning given the monitored conditions, is delivered over line 144 and is received by comparator stage 146. Comparator stage 146 is also connected over line 126 to the rear drive shaft speed sensor 104. The inputs from computation stage 142 and from speed sensor 104 are processed in the comparator stage 146 and a judgment is made whether the rear wheels are turning at a speed indicative of slip conditions. If a wheel slip condition is sensed or computed, comparator stage 146 delivers, over line 148, a wheel slip indication to the "OR" circuit 136 of the wheel slip indicator means 116. It will be understood that the signal translation path 130 has essentially the same computation stages as those comprising translation path 128. Because the stages along path 130 are essentially the same and operate in essentially the same manner as those in signal translation path 128, the stages thereof are provided with similar reference numerals. An upper speed limit for the monitored front shaft speed is computed by the second translation 130 path and is used in analogous way to that speed limit developed by signal path 128.

This relative speed method for detecting wheel slip can be operated more precisely than those of other systems for several reasons. First, the slip detecting method is sensitive to steering angle, which generates speed differences that do not constitute wheel slip. Therefore, this method can distinguish the source of the speed difference and thereby operate at tighter tolerances. Second, the allowable speed difference can be set separately for front wheel over speed and rear wheel over speed. Third, allowable speed differences can be programmed as a function of vehicle speed, to give tight and loose tolerances as required by driving conditions.

The signal translation paths 132 and 134 provide an acceleration method for detecting wheel slip. The signal translation path 132 also derives input from the front drive shaft speed sensor 102 over line 122. Inputs along path 132 are first received at a differentiator stage 150. The differentiator stage converts these inputs into an acceleration signal. Alternatively, a shaft acceleration sensor could be used in place of the differentiator stage. The output from the differentiator stage 150 is delivered over line 152 and acts as one of two inputs to a comparator stage 154. The other input to the comparator stage 154 is delivered over line 156 and represents a front drive shaft acceleration limit value. The front drive axle acceleration limit value is predetermined in the comparator stage by setting a value which cannot be exceeded without the road wheels losing traction with the surface. The output from the differentiator 150 and the acceleration limit value are processed in the comparator stage 154 and a judgment is made whether the acceleration of the monitored shaft exceeds the limit value such that slip conditions are indicated. If a wheel slip condition is sensed or computed, comparator stage 154 delivers, over line 158, a wheel slip indication to the "OR" circuit. The signal translation path 134 has essentially the same computation stages as those comprising translation path 132. The acceleration limits and values of path 134 are computed and used in an analogous way to those computed along path 132. Therefore, the stages of path 134 are characterized with similar reference numerals as those in path 132. As mentioned above a slip indication from any one of the four signal translation paths 128, 130, 132 or 134 to the "OR" circuit 136 will trigger an output signal over line 160 which signal indicates wheel slip.

FIG. 7 is a block diagram showing the main or primary stages of the clutch torque command generator means 118. As indicated, in its present form, the clutch torque command generator means 118 reads and computes input from two sources and develops an output signal over line 180. One input source is provided by the wheel slip detector means 116 over line 160. The other input sensor represents engine data and is provided to the clutch torque command generator means over line 162. The purpose of the clutch torque command generator means 118 is to compute or determine a desired clutch torque level and to produce a torque command or output reflective of the desired clutch torque level at a particular time.

Derivation of a wheel slip indication was discussed in detail above and, thus, no further detail will be provided therefore. As with the wheel slip indicator means 116, the clutch torque command generator means 118 may take more than one form. The block diagram of FIG. 7 being illustrative of the various functions and stages included within the clutch torque command generator means 118. It should be appreciated, however, that other forms may be provided without distracting from the scope of the present invention. Engine data is provided to the clutch torque command generator means 118 over line 162. Engine data is derived from two signals. That is, the engine speed sensor means 106 and the throttle position sensor 108 both provide signals to a processor 164. In a known manner, the processor produces an output reflective of engine torque. Basically, the clutch torque command generator means includes two stages. First, there is a target torque stage 166. The target torque stage 166 operates in combination with a profile generator stage 168. The purpose of the target torque stage 166 is to determine an appropriate target torque level for the clutch assembly. That is, the target torque stage 166 sets a particular or controlled level of torque which is based on the input torque to the transfer case. The purpose of the profile stage 168 is to create a time dependent torque command which is delivered over line 180 to the actuation stage 103 of the control system.

FIG. 8 is a block diagram illustrating the functions or stages of the target torque stage 166. As illustrated in its preferred form, the target torque stage 166 has first and second computing stages 170 and 172. A plurality of inputs indicative of engine torque over line 162, engine speed from speed sensor 106 over line 169, and front and rear drive shaft speeds from sensors 102 and 104 over lines 122 and 126, are all provided to the first computing stage 170. As mentioned above, measurements of engine speed and throttle position are used by apparatus 164 to compute the engine output torque. At the first stage 170, the measurement of engine speed and the transfer case output shaft speeds is used to compute the transmission gear ratio. At the first stage, the engine output torque and transmission gear ratio are further processed to determine the total input torque to the transfer case. The output of stage 170 is delivered over line 174 and represents the level of total torque imparted to the input shaft 41 of the transfer case 24.

The next step is to establish an appropriate torque level to be applied in the event of wheel slippage. This additional step is accomplished in the second computing stage 172 of the target torque stage 166. The second stage 172 of the target torque stage is so devised that it will set a target or maximum controlled level of torque for the clutch as a function of the level of total torque imparted to the transfer case. It should be appreciated, that the target torque level signal may be less than that required to fully lock the clutch. The output of the second stage 170 is delivered from the target torque stage 166 over line 178.

Returning to FIG. 7, the output of the target torque stage 166 is delivered over line 178 and serves as one input to the profile generator stage 168. The profile generator stage 168 is responsive to two inputs. The other input to stage 168 is received over line 160 from the wheel slip indicator means 116. When a wheel slip indication is provided by the wheel slip indicator means 116, the profile generator stage 168 then looks to the target torque stage 166 to determine the level of torque to be applied to the clutch.

FIG. 9 schematically represents the output developed by the profile generator stage 168. As mentioned above, at the instant the wheel slip indicator means determines wheel slippage, a trigger signal is produced and is delivered over line 160 to the profile generator stage 168. The profile generator stage 168 develops a clutch torque command which causes the clutch torque to increase to a maximum target torque level established by the target stage 166. As schematically illustrated in FIG. 9, the clutch torque command will increase over a predetermined period of time referred to as "rise time" phase. The profile generator stage then initiates a "target hold" phase during which the clutch torque command is maintained at a substantially constant target level for a predetermined "target hold" period or phase. At the expiration of the "target hold" phase, the profile generator stage steadily reduces the level of the clutch torque command to its initial setting over a predetermined period referred to as "return time" phase. The duration of each of the above described phases may be individually preset.

During the "rise time" phase, the profile generator stage may receive continued or repeated wheel slip indications from the wheel slip indicator means. That is, the wheel slip indicator means 116 remains active and may indicate wheel slip at any point in the clutch application cycle. The profile generator stage, however, will ignore such indications from the wheel indicator means during "rise time" phase and will continue to ignore such indications from the wheel slip indicator means for a predetermined "lock out" period. After the "lock out" period lapses, the profile generator stage will respond to wheel slip indications by accepting a new torque target and return to the "rise time" phase until the new torque target level is reached. The "target hold" phase and "return time" phases, as previously described, may be interrupted by any number of subsequent retrigger conditions.

As indicated in FIG. 7, the output of the clutch torque command generator means 118 is delivered over line 180 to the actuator stage 103 of the control system.

The actuator stage 103 may include clutch drive means including a current scaling means 182. The apparatus 182 receives inputs from the torque command generator means 118 and translates the clutch torque commands into a current level corresponding to that necessary to establish the clutch torque level dictated by the torque command generator means 118. The operative means 182, applies the proper current to the electromagnetic energizer 70 over line 184 to produce torque between the friction members of the clutch assembly to a level called for by the clutch torque command generator means 118. The operative means 182 may take the form of a pulse width modulator. Operative means 182 may also receive inputs over line 186 from the temperature sensor means 112. By this construction, the level of current applied to the clutch may be regulated as a function of the operating transfer case fluid temperature and predetermined clutch characteristics, to develop the commanded clutch torque, regardless of temperature.

In operation, speed signals reflective of the drive shaft turning speeds are derived from sensors 102 and 104. These signals along with signals reflective of other present vehicles characteristics are provided as inputs to the computer or command stage 103 of the control system 100. The outputs from sensors 102, 104 and 110 are applied to the wheel slip detector means 116 of the command stage 103 and are simultaneously processed through signal translation paths 128, 130, 132 and 134. A slip indication produced by any one of the signal translation paths will cause the "OR" circuit 136 to produce an output over line 160. The output transmitted over line 160 is a two level output indicating the presence or absence of excessive wheel slip.

The output of the wheel slip detector means 116 is received by the clutch torque command generator means 118. The clutch torque command generator means 118 computes a particular or time dependent torque command which controls clutch application. In this manner, the torque applied by the clutch assembly 46 acts in response to the present vehicle conditions and operator demand.

As indicated in FIG. 7, the actuator stage 103 of the control system receives commands from the clutch torque command generator means from 118, translates those commands into electrical current, and applies a calculated level of current to the electromagnetic energizer 70 over line 184 whereby energizing the coil 70 for a predetermined length of time. Thereafter, the clutch current is dropped off while the control system constantly monitors continuing vehicle performance and operator demands. If desired, the output of the actuator stage 103 may be modified to control the effective operation of the clutch as a function of the differential oil temperature fluid.

Figure 10:
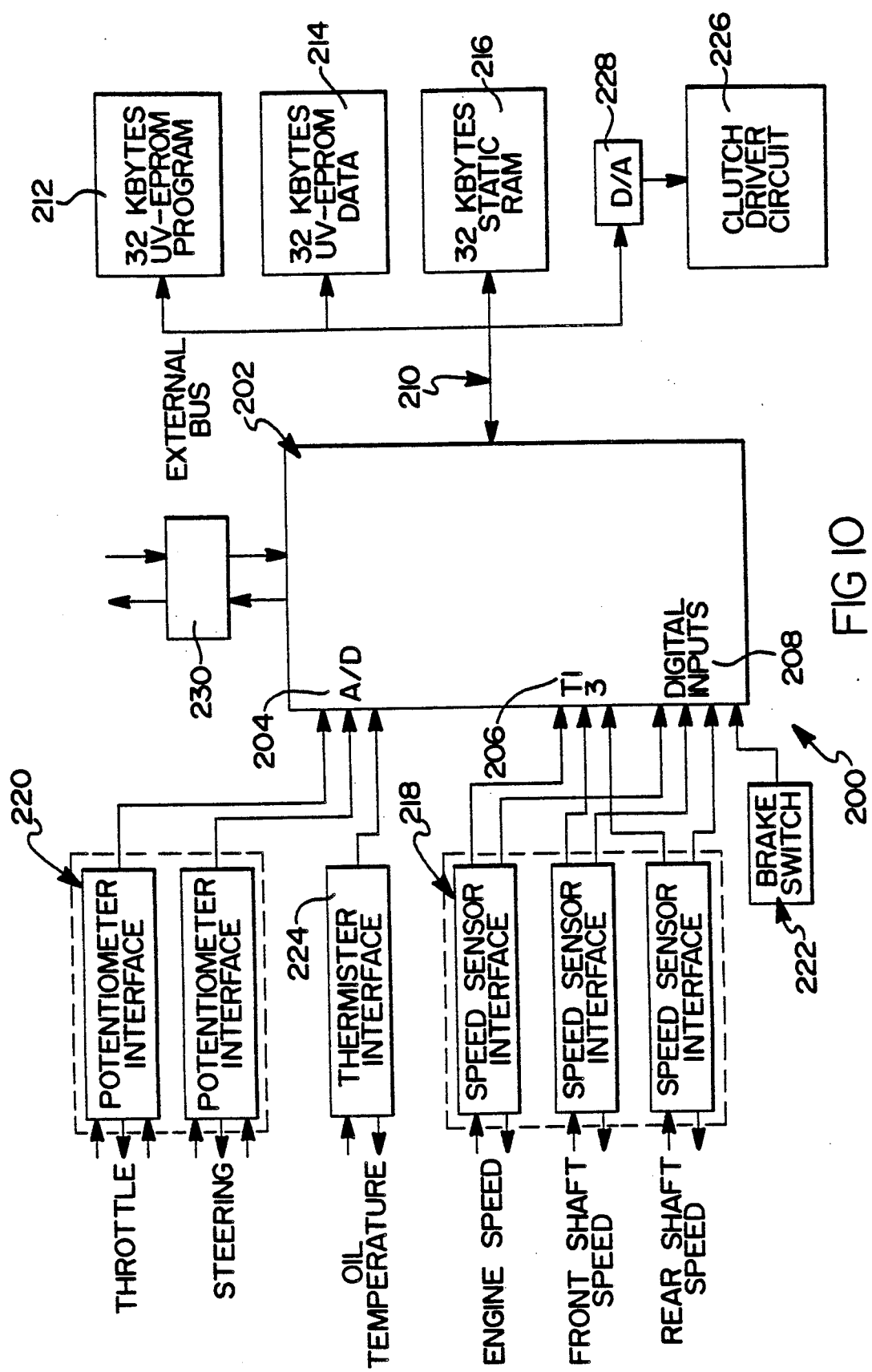
FIG. 10 is a diagrammatic view of a microprocessor based controller including another embodiment of the present invention.
Figure 11:
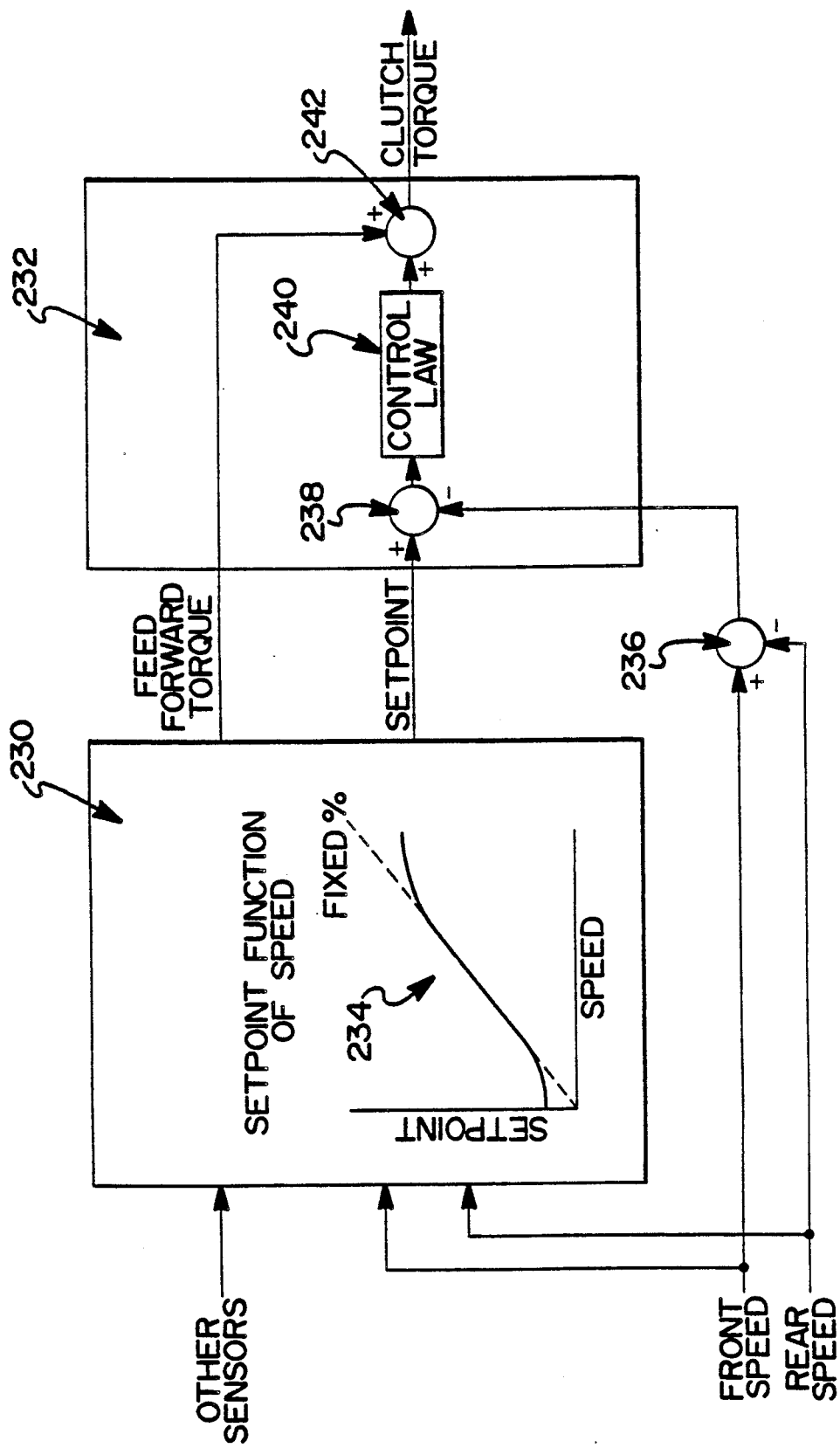
FIG. 11 is a block diagram of a vehicle handling strategy module and a feedback control loop module of the microprocessor of FIG. 10.

Referring now to the embodiment of the inventions in FIGS. 10 and 11, an all wheel drive controller 200 is illustrated. The controller 200 is microprocessor based and includes a microcomputer 202 by Motorola Model No. 68HC11. The microcomputer 202 includes on chip features including an analog to digital converter 204 for converting vehicle operating conditions such as throttle position, steering wheel position, and oil temperature conditions in the transfer case from an analog signal to a digital signal for use in programming to be discussed.

Additionally, the microcomputer 202 includes an internal timer 206 having three inputs and four outputs. The microcomputer 202 further includes a plurality of digital input ports 208. The microcomputer 202 operates in an expanded bus mode and includes an external bus 210 interfaced with a 32K byte EPROM 212; a 4K byte EPROM 214 and a 2K byte RAM 216 which is used as a work space in performing the program functions of the all wheel drive controller 200.

A speed sensor interface 218 is provided to condition signals of engine speed, front shaft speed and rear shaft speed. The speed sensor interface 218 includes suitable logic to generate a digital wave form the period of which is measured by an internal timer of the microcomputer 202. The signal can be further enhanced by digital filtering provided in the software for the microcomputer 202.

A potentiometer interface 220 receives signals from each of the throttle position and steering wheel potentiometers. The potentiometer interface 220 supplies the signal potentiometers of throttle and steering position with a voltage source and also conditions the output signal from both potentiometers by suitable filtering through a buffer amplifier (not shown) having an output which is directly coupled to the analog-to-digital converter port 204 of the microcomputer 202. A brake switch signal module 222 is interfaced through suitable filtering and digital logic means for connection to one of the digital input ports 208 of the microcomputer 202. An oil temperature signal is processed at a thermistor interface 224 to provide a continuously sensed temperature operating condition for overriding the basic microcomputer control 202 of a clutch driver circuit 226 which is coupled to the external bus 210 of the microcomputer 202 through a digital-to-analog converter 228.

For purposes of this specification, it is only necessary to understand that the clutch driver circuit 226 is a current sensing closed loop device. The microcomputer 202, as will be discussed, is operating to produce a clutch command signal that will control an electromagnetically operated clutch device of a type set forth above to control the slip speed between the front shaft speed and the rear shaft speed therefore providing a regulation of the torque split so as to produce an optimized vehicle drive strategy. The command current requested by the microprocessor is used to set a voltage through the digital-to-analog converter 228. This voltage is compared to a voltage across a current sensing resistor (not shown). The comparative output is then utilized to control power switching devices that deliver the actual energization current to the magnetic clutch coil.

The microcomputer 202 further includes an interface board 230 that serves to couple serial communication and diagnostic equipment including diagnostic software.

The operation of the microcomputer 202 is under the control of software which is diagrammatically illustrated in FIG. 11 as including a vehicle handling strategy control module 230 and a control loop module 232. The vehicle handling strategy module 230 receives the vehicle operating signals and is operative to produce outputs indicative of overall vehicle performance.

The control loop module 232 receives command signals from the vehicle handling strategy module 230 and is operative to smooth the operation of the electromagnetically operated clutch device so that the accuracy in response to varying vehicle operating conditions can continuously adjust the torque split between the front and rear drive shafts of the vehicle to smooth the operation of the transfer case or drive transfer unit 24 so as to prevent abrupt changes in the level of torque transfer therebetween such that a driver of the vehicle is unaware of the changes.

Referring now more particularly to the vehicle handling strategy module 230. The module is operative to produce a desired slip speed setpoint signal for various inputted operating conditions directed to the microcomputer 202 from the vehicle operating condition sensor array.

Basic guidelines for establishing a program of operation of the vehicle handling strategy module can include one or more of the following considerations.

Vehicle stability can be maintained by distributing more torque to the front axle as the vehicle speed increases. The clutch torque can be changed in response to engine torque changes. The slip speed setpoint which is produced by the vehicle handling strategy module 230 can compensate for differences due to cornering characteristics of the vehicle. Special procedures can be included for brake and fail safe operation as desired.

Ordinarily yaw direction stability margin will decrease as vehicle speed increases. Accordingly, the slip speed setpoint which will be generated by the vehicle handling strategy module 230 should be coordinated with a feed forward torque signal to provide a desired torque distribution as a function of vehicle speed.

In accordance with certain aspects of the present invention, a feed forward torque signal from the vehicle handling strategy module 230 is provided to effect the clutch torque directly while the slip speed setpoint is estimated from vehicle characteristics such as the road torque tire slip speed characteristic for a given vehicle.

Usually the feed forward signal is produced by analyzing the input signals and producing a conservative approximation of the clutch torque required to maintain a desired torque distribution as defined by a vehicle handling strategy which is selected. The purpose of a feed forward signal is to reduce steady state error in the closed loop module 232 and to provide a dynamic signal to compensate for disturbances in the control loop module 232. For example, the feed forward torque signal from the vehicle handling strategy module 230 can be selected to respond to an increase in engine torque by increasing a clutch control signal, to be described, in a manner which will maintain a desired torque distribution between the front and rear axles of a vehicle. The feed forward torque signal is inputted to the microcomputer memory and is later summed with the output of a control law which operates on a bang-bang algorithm to move the average value of the clutch torque up or down to compensate for system disturbances. Alternatively, the output of the control law can be established in accordance with a control law based upon pulse width modulation based upon the feedback signal or a control law based upon proportional integrated differentiation of the feedback signal.

The slip speed setpoint established by the vehicle handling strategy module 230 is a command signal to the closed loop module 232. This setpoint is compared to an actual slip speed signal produced by the vehicle. The difference between the command value and the actual slip speed value is a slip speed error signal which is processed by the microcomputer 202 in a manner to be discussed so as to produce a signal to the clutch driver circuit 226. The error signal is a low level signal which will determine the coil current applied by the clutch driver circuit 226 to either increase or decrease the clutch torque in order to meet the desired slip speed setpoint.

Referring now more particularly to FIG. 11, a graph of one function 234 is illustrated. The function is loaded into the microcomputer 202 and will analyze a vehicle speed signal and produce a desired slip speed setpoint output from the module 230 as set forth on the function generation curve 234. At lower vehicle speeds, the slip speed setpoint is constant. As vehicle speed increases, the slip speed setpoint is shown as increasing. The linear portion of the curve indicates that the setpoint will be a constant percent of the vehicle speed. Such a function will result in a desired fixed torque distribution between the front and rear shafts during such vehicle speed operation. As the slope of the curve 234 decreases, the percentage of slip speed decreases, thus moving the torque distribution from the rear to the front axle of the vehicle. The transfer function represented by the curve 234 is exemplary of functions that can be loaded into the microcomputer 202 which can thereafter produce an analysis of the vehicle operating conditions to establish a desired slip speed setpoint that can be coordinated with the feed forward signal to provide a desired torque distribution as a function of vehicle speed, for example. The vehicle handling strategy can also include additional functions which will provide special condition commands as well as fail safe signals to the control loop module 232. For example, analysis of four-wheel drive vehicle stability indicates that an open differential will provide minimum interference with both normal braking an ABS operation. Thus, the vehicle handling strategy module 230 can include limits wherein the coil of an electromagnetically operated clutch assembly is deenergized at any time that the brakes are activated.

Also, a fail safe condition for control systems of the type set forth herein is also an open differential wherein the clutch coil is deenergized. If there is any electronic component failure, the control module 230 can be provided with a function which will detect a signal reflecting such failure to produce a setpoint signal that will deenergize the electromagnetic clutch for distributing torque between the front and rear shaft and thereby open the differential to provide a nominal torque distribution between the front and rear shaft.

Furthermore, the programming of the module 230 can include several self test procedures for failure detection. One such programming sequence would be to require a test that will indicate that each of the component parts of the microcomputer of the all wheel drive controller 200 are powered up when the vehicle ignition is turned on. Also, the program sequence could include a step that will perform a real time test which is executed periodically during operation of the all wheel drive controller 200. Finally, the microcomputer 202 can include a program step wherein each of the components are tested to provide a compete check out of the system prior to operation thereof.

Referring now more particularly to the control loop module 232, the measured front shaft speed and measured rear shaft speed are stored in the computer memory and are inputted to a summing junction 236. Junction 236 produces a speed difference signal or actual slip speed signal which can be stored in computer memory. The actual slip speed signal and the desired setpoint signal are extracted from memory and inputted to a summing junction 238 for producing a slip speed error signal. If the actual slip speed exceeds the setpoint value (the error is negative), then the microcomputer 202 generates a maximum output signal to the clutch drive circuit 226. A positive error signal causes a minimum value signal to be directed to the clutch driver circuit 226.

More specifically, the control loop module 232 is a servo mechanism whose purpose is to drive the front to rear slip speed to the setpoint established by the vehicle handling strategy module 230. In order to accomplish this objective, in accordance with the present invention, the slip speed signal of actual slip produced at the summing junction 236 is a feedback signal used to improve the accuracy of the loop in producing a clutch torque control signal to the clutch drive controller 226. One aspect of the present invention is that the error signal produced by summing the actual slip speed feedback signal with the desired slip speed setpoint at summing junction 238 is used to produce an on-off control signal having a frequency which is established by upper and lower error signal limits. More specifically, as shown in FIG. 4, the error signal is directed to an on-off switching mechanism 240 that is operated under a control where the output from the switch 240 will be either a maximum or a zero, depending on the sign of the error signal. The frequency of the on-off cycle of the switch means is established in part by the characteristics of the all wheel drive system. The frequency of the on-off pulses produced by the switch 240 are established by the characteristics of the vehicle, including factors such as clutch hysteresis and primary vehicle dynamics, as well as the load transfer from the front to the rear axles of the vehicle, engine dynamics, nonlinear tire curves, nonlinear clutch friction characteristics, and the effects of the sampling produced by the microcomputer 202. Simulation of models including such variables has shown that the limit cycle frequencies of the switching device 240 are in the range of 4 to 9 Hz depending upon the slip speed setpoint which is directed from the vehicle handling strategy module 230 to the control loop module 232. The feed forward torque signal is inputted to the control loop module where it is summed with the output of the control law at summing junction 242 to modulate the clutch torque.

Figure 13:
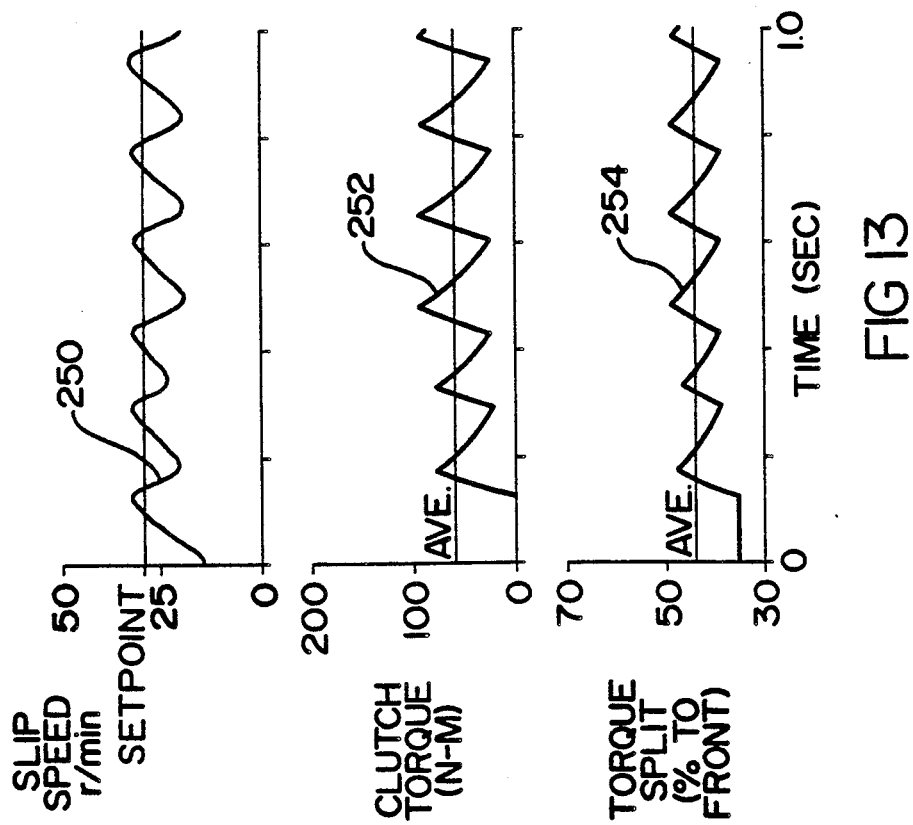
FIGS. 12 and 13 are comparative plots of a simulated operations of a controller respectively for desired slip speed setpoints of 15 and 30 revolutions per minute.
Figure 12:
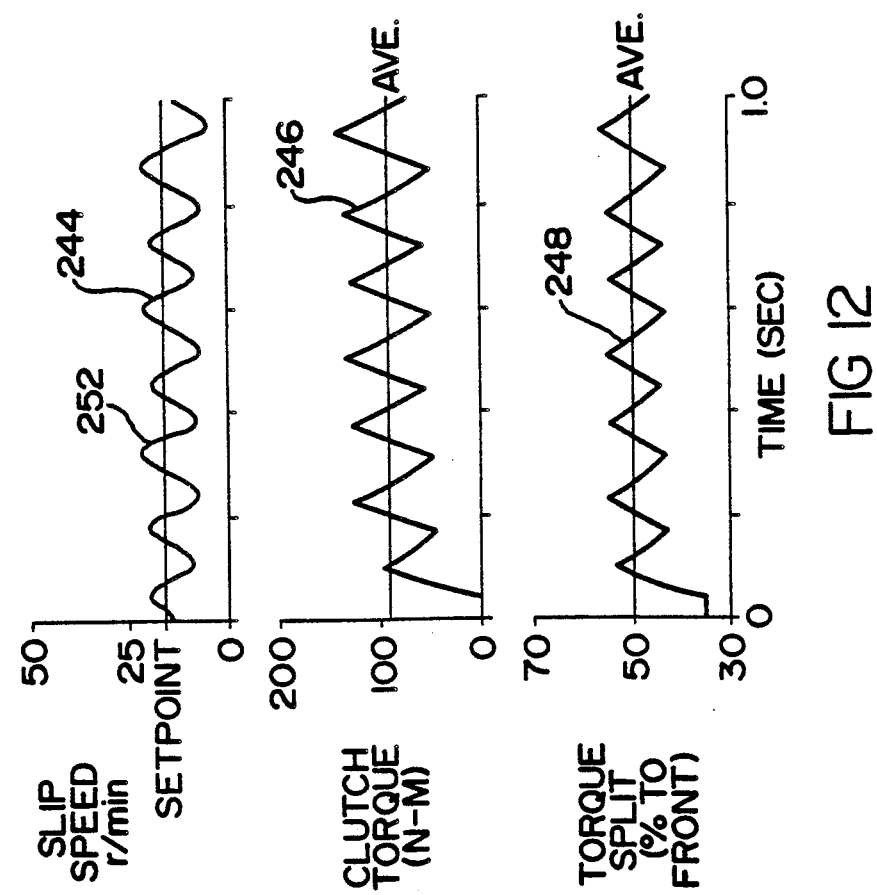

FIG. 12 shows comparative graphs of slip speed variation over time; clutch torque over time and the torque split produced over time for a simulated vehicle handling strategy setpoint signal of 15 r/min. In order to maintain this desired slip speed setpoint, the controller 202 will detect changes in the actual slip speed to produce a change in the actual slip speed that follows a curve 244. The clutch torque will vary in accordance with a curve 246 and the torque split will vary in accordance with a curve 248. As the slip speed increases above the setpoint at a predetermined upper limit, the clutch signal is turned on and the torque begins to rise as shown in curve 246. The increasing torque causes the wheel speed difference to eventually decrease. When the speed difference becomes less than the setpoint, the clutch signal is turned off and the speed difference again will start to increase. The behavior is periodic in nature. For a 15 r/min setpoint, the frequency of switching is approximately 9 Hz and the peak-to-peak slip speed amplitude is roughly 10 r/min. The frequency for the 30 r/min setpoint case is approximately 6 Hz and the peak-to-peak slip speed amplitude is roughly 10 r/min as shown by the slip speed curve 250. FIG. 13 also includes comparative clutch torque curve 252 and comparative torque split curve 254 for the set point case of 30 r/min. In either illustrated setpoint case, the frequencies are still high compared to normal vehicle dynamic conditions so that the response of the system will be adequate.

Referring to FIGS. 12 and 13, the first thing that can be observed is the periodic nature of the limit cycle behavior of the system. As shown by curves 244, 250, as slip increases above the setpoint, a clutch signal is turned on and the torque begins to rise as shown in curves 246, 252. The increased torque will produce a wheel speed difference that will eventually decrease. As the speed difference, e.g., the actual slip speed signal becomes less than the setpoint, the clutch signal is turned off. This causes the speed difference to increase to repeat the cycle. The behavior is clearly periodic.

A further operating feature of the controller 200 is shown in curves 248, 254. In general, it is desirable to have a vehicle torque split which is biased toward the rear axle. Thus, the rear wheels tend to slip more than the front wheels. As the slip reaches the setpoint at shown in curves 244 and 250, the clutch is turned on to transfer torque to the front axle which is reflected in the torque split curves. Therefore, the torque split becomes more biased toward the front axle.

As can be seen by the curves 246, 252, as the slip setpoint is decreased, the clutch torque required to maintain the setpoint becomes greater. This relationship is established by tire characteristic curves. As the slip setpoint is decreased, the rear tires slip less and the front tires more. This causes more torque to be generated at the front and less at the rear. Thus, the clutch torque required to balance the system becomes greater. These results are summarized in the following table which illustrates the relationship between the tire slip characteristics, clutch torque, the torque split and under steer.

|  | Smaller Slip | Greater Slip |
|---|---|---|
| Rear Tire Slip | ↓ | ↑ |
| Rear Tire Torque | ↓ | ↑ |
| Front Tire Slip | ↑ | ↓ |
| Front Tire Torque | ↑ | ↓ |
| Clutch Torque | ↑ | ↓ |
| Torque Split | Forward | Rearward |
| Under Steer | ↑ | ↓ |

The ability to modify the torque split with the controller 200 allows the handling of the vehicle to be changed automatically by the controller 200. As the slip point is decreased, the torque split becomes more biased toward the front. Thus, the vehicle handling characteristics can be made to approach those of a front wheel drive car, e.g., the car exhibits more under steer. As the setpoint increases, the torque split moves toward the rear and the car becomes less susceptible to under steering. Thus, the vehicle handling strategy module, by determining the setpoint, will obtain desired handling characteristics as required. The controller 200 can provide enough rear torque bias to give good response at low speeds while also shifting torque to the front at higher speeds for stability.

The results of an actual test program are set forth in FIGS. 14 through 15.

A Ford Sierra XR4×4 was modified to accept Borg-Warner's Torque-on-Demand system. Full throttle starts were run from a standstill with a simulated front-/rear friction coefficient split. Tests were run using several different slip speed setpoints. Measurements of slip speed and clutch torque command were recorded during the run.

Under ordinary dry pavement conditions, it is difficult to generate large amounts of wheel slip. Further, on low friction surfaces, it is difficult to maintain conditions which require large control clutch torques. For the purposes of the control system tests, the split friction coefficient was simulated by use of a skid car.

The skid car is a four-wheeled dolly, which can lift an arbitrary amount of weight off of the vehicle's wheels and support it on the castered wheel of the dolly. The weight on the front and rear wheels can be controlled independently. Unloading the vehicle's wheels has a similar effect to reducing the ground friction coefficient. Controlling the front and rear loads separately makes it possible to create a large difference between the torque split in the center differential and the available traction torque split. This in turn makes it possible to maintain a situation in which a large clutch torque is required to control wheel slip.

In each test, a fixed slip speed setpoint was used throughout the run. It was not determined by the vehicle handling strategy, but by the need to run simple repeatable experiments.

The tests were run on wet asphalt. The same portion of the lot was used as the starting point for each run. The skid car unloaded the rear wheels by about 50% and left the front wheels fully loaded. It is estimated that the effective frictions coefficients were 0.6 at the front and 0.3 at the rear.

For consistency, full throttle starts were run at each selected slip speed setpoint. The engine speed was raised to about 4000 r/min initially; then the throttle pedal was fully depressed, and the clutch was released in a way that kept the engine speed up.

Data is shown in FIGS. 14 and 15 from runs at two slip speed setpoints (20, and 50 r/min). Strip chart recordings show the torque command (on or off) from the bang-bang algorithm, and the slip speed computed by the controller 200 (rear axle speed minus front axle speed).

The first observation to make is the performance resembles the limit cycle behavior predicted by simulation. In each case, the data show that the slip speed grew (as the rear wheels lost traction), the clutch was applied, the slip was controlled and the clutch was released, and the cycle repeated. Both cases show an oscillation period of about 0.2 seconds, which corresponds to the 5 Hz rate predicted by the simulation.

The most important test result is the effect of the setpoint on the actual slip speed. Comparison of the slip speed traces for these runs shows that the average slip speed is close to the setpoint.

The torque command signal out of the bang-bang algorithm varied from run to run in a way that corresponds to the slip speed variation. In each case, the clutch command signal switched between the on and off states as the slip speed crossed the setpoint. The data show that the clutch on time was greater in the 20 r/min case than in the 50 r/min case. The reason is that it takes a more forward torque split to maintain a smaller slip speed. A more forward torque split requires more clutch torque, which means the bang-bang algorithm must turn the clutch on for a greater portion of the time.

Subjectively, the system performance was very appealing. The clutch applications were imperceptible without reference to an audible indicator installed in the dash. There was no bumps, jerks or noises from the drive train. Comparing the vehicle performance in the various case, the driver had a strong perception of traction and acceleration with the 20 r/min setpoint. By contrast, there was a lot of wheel spin without much motion when the setpoint was greater.

In conclusion, the slip speed servo loop of the present invention effectively controls the difference between front and rear wheel speeds. Despite the use of an on-off control law, the clutch operation is fairly smooth and the resulting oscillations are small.

The vehicle handling strategy commands this servo loop to alter the torque split of all all-wheel drive vehicle as a function of operating conditions. In this way, high levels of traction, stability and vehicle responsiveness are achieved.

Thus, there has been provided a SYSTEM FOR CONTROLLING TORQUE TRANSMISSION IN A FOUR WHEEL DRIVE VEHICLE which fully satisfies the objects, aims and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

Thus, having adequately described my invention, what I claim is:

1. A system for distributing torque to all four drive wheels of a vehicle powered by an engine, said system comprising:
    a transfer case connected to said engine and having an input shaft connected to front and rear drive axles, said transfer case further including a differential for interconnecting said input shaft with the front and rear drive axles such that torque is transmitted to both of said drive axles in a predetermined manner;
    a control system means including sensor means for monitoring drive axle rotational speeds and engine operating conditions, wheel slip detector means for detecting a slip condition between said front and rear drive axles and for generating an output, clutch torque command generator means responsive to the output of said wheel slip detector means for calculating and generating an output which is computed as a predetermined function of total torque delivered to said transfer case and delivered to a clutch actuator means;
    said clutch torque command generator means including a first means for establishing a predetermined target torque level as a function of the total torque delivered to the transfer case and a second means for establishing the time torque is applied operatively connected to said first means and responsive to said output from said wheel slip detector means indicative of wheel slip; and
    modulatable biasing clutch means operatively connected with the transfer case and including an electromagnetically actuated clutch assembly with friction members which are operably effective to interconnect two members of said differential, wherein said clutch actuator means regulates the electromagnetic clutch assembly in a manner whereby controlling the operable effectiveness of said clutch assembly and thereby controlling torque transmission to the front and rear drive axles as a function of a torque level established between said friction members.

2. The invention according to claim 1 wherein said engine includes a positionable throttle and the total torque delivered to the transfer case is calculated from monitoring engine speed, engine throttle position and the respective speeds of said front and rear drive axles.

3. The invention according to claim 2 wherein said second means includes means for increasing the torque level to the target torque level over a predetermined time period and then maintaining the torque level generally constant for a second predetermined time period.

4. The invention according to claim 1 wherein said clutch actuator means apply a current to said electromagnetically actuated clutch assembly in a manner producing torque between said friction members to a level established by said clutch torque command generator means.

5. A system for controlling torque transmission between an engine of a four wheel drive vehicle and each of its driven wheel, two of which steer the vehicle and are driven by front drive axle means and two of which are driven by rear drive axle means, said system comprising:
    a center differential having an input shaft operably to said engine and two rotary power output shafts for driving said front and rear drive axle means, said center differential including a gear set arrangement for establishing a drive path from said input shaft to both of said output shafts;
    means for biasing torque between said two power shafts, said biasing means including an electromagnetically actuated clutch assembly having a series of interleaved friction members which are permitted to turn relative to one another when the clutch assembly is less than fully engaged, some of said friction members being arranged to turn with one output shaft and the remainder turning with the other output shaft; and
    an information processing unit having operative means for receiving a plurality of inputs including an input indicative of the rotational speed of said output shafts and an input indicative of present engine operating conditions and an input indicative of the steering angle of the vehicle, and processing unit further including means for processing said inputs to generate a calculated control output which regulate the torque level to be established between said friction members of the clutch assembly in a manner biasing torque between the output shafts in accordance with vehicle operating conditions and operator demand;
    said processing unit including detecting means for determining wheel slip as a function of one of output shaft acceleration rate and the relative turning speeds of said output shaft in conjunction with steering angle, and for generating an output indicative of the wheel slip.

6. The control system of claim 5 wherein said detecting means includes apparatus for determining wheel slip as a function of output shaft acceleration rate.

7. The control system of claim 5 wherein said detecting means includes apparatus for determining wheel slip as a function of the relative turning speeds of said output shafts.

8. The control system of claim 5 wherein said processing unit further includes means for monitoring total torque delivered to the center differential through said input shaft.

9. The control system of claim 8 wherein said engine includes a positionable throttle and the total torque delivered to the center differential is computed from engine speed, throttle position and power output shaft speeds.

10. The control system of claim 8 wherein said processing unit further includes means, responsive to said means for detecting wheel slip, for regulating the application of said electromagnetically actuated clutch i a predetermined manner and as a predetermined function of the total torque delivered to the center differential.

11. The control system of claim 10 wherein the predetermined clutch application initially includes a predetermined rise in the torque level to be established between said friction members for a predetermined time period followed by a substantially constant torque level application for a second predetermined time period.

12. The control system of claim 10 wherein said processing unit further includes means, operatively connected with said means for regulating the application of said clutch, for applying current to the electromagnetically actuated clutch assembly to control the torque established between said interleaved friction members in response to the calculated control output.

13. The control system of claim 12 wherein said center differential includes a fluid containing housing in which said clutch assembly is arranged, and said information processing unit receives inputs from a fluid temperature sensor which monitors the fluid temperature in said housing and generates an output indicative thereof and wherein the current applied by said means for applying proper current is a calculated function of the output generated by said fluid temperature sensor.

14. A system for controlling torque transmission between an engine of a four wheel drive vehicle and each of its driven wheels, two of which are driven by front drive axle means and two of which are driven by rear drive axle means, said system comprising:
a center differential having three shafts interconnected in a driving relationship by a gear set, one of said shafts being operably connected to said engine with the other two shafts being respectively connected to the front and rear drive axle means, said gear set dividing the torque imparted to said center differential through said input shaft to each of said other two shafts in a predetermined manner, means for biasing torque between said other two shafts, said biasing means including an electromagnetically actuated clutch assembly having a series of interleaved friction members which are permitted to turn relative to one another, some of said friction members being arranged to turn with one of said shafts and the remainder turning with the other shaft, the turning rates of said friction members being governed by the torque established therebetween;
means for monitoring vehicle operation and operator demand on said engine, said monitoring means including means for sensing the rotational speed of each of said other two shafts and developing outputs reflecting the respective shaft speed; and
control circuitry means connected to said monitoring means, said control circuitry means including first operative means for determining when a slip condition exists between said two other shafts, second operative means arranged in combination with said first operative means for establishing a target clutch torque to be applied between said friction members, and third operative means for energizing said clutch assembly to a level determined by the target clutch torque and as a function of vehicle operating conditions and operator demands in the engine; said second operative means including first means for computing total torque delivered to the transfer case and second means for establishing the target clutch torque as a function of total torque delivered to the transfer case.

15. The invention according to claim 14 wherein said first operative means includes means for comparing said speed sensing means output relative to each other.

16. The invention according to claim 14 wherein at least two of said wheels are used to steer the vehicle and wherein said monitoring means further includes means for sensing the present steering angle and generating an output of same.

17. The invention according to claim 16 wherein said first operative means computes at least the outputs of each rotational shaft sensing means and the steering angle sensing means to determine when a slip condition exists.

18. The invention according to claim 14 wherein said second operative means includes means for establishing the manner and time by which the torque will be applied by the clutch assembly.

19. The invention according to claim 14 wherein said first means includes means for receiving a plurality of inputs including an input indicative of engine torque, an input indicative of engine speed and inputs from each of said means for sensing the rotational speed of each of said other two shafts.

20. The invention according to claim 19 wherein said engine is throttle controlled and the input indicative of engine torque is provided by an apparatus including means for receiving and processing a plurality of inputs including an input indicative of the position of the engine throttle and an input indicative of engine speed.

21. The invention according to claim 20 wherein said second operative means is responsive to said first operative means.

22. In combination with a four wheel drive vehicle having front and rear road wheels driven by an engine and a steering mechanism for effecting the steering angle of at least one pair of the front and rear road wheels, a system for continuously distributing driving torque to all four wheels of said vehicle comprising:
a fluid containing transfer case connected to said engine and having an input shaft connected to front and rear drive axles, said transfer case further including a multimembered gear set for connecting said input shaft with the front and rear drive axles such that torque is normally split between both of said drive axles in a predetermined manner;
modulatable biasing clutch means operatively connected with said transfer case and including an electromagnetically actuated clutch assembly with friction members, some of which turn with the front drive axle means and others which turn with the rear drive axle means, said clutch assembly being operably effective to bias torque through said gear set as a function of the torque through said gear set as a function of the torque level established between said friction members;
first operative means for establishing whether acceleration of said front drive axle exceeds a predetermined limit and for generating a wheel slip indication when said predetermined limit is exceeded;

second operative means for establishing whether acceleration of said rear drive axle exceeds a predetermined limit and for generating a wheel slip indication when said predetermined limit is exceeded; and third operative means connected to said electromagnetically actuated clutch and responsive to an indication of wheel slip from either said first or second operative means for regulating the level of torque established between said friction members to correct for wheel slip.

23. The system of claim 22 wherein said first operative means includes means for receiving a plurality of inputs including a first input indicative of front drive axle acceleration and a second input indicative of a predetermined allowable upper speed limit, processing those inputs, and producing a wheel slip indication when said predetermined upper limit is exceeded.

24. The system of claim 22 wherein said second operative means includes means for receiving a plurality of inputs including a first input indicative of rear drive axle acceleration and a second input indicative of a predetermined allowable upper acceleration for speed limit, processing those inputs, and for producing a wheel slip indication when said predetermined upper acceleration limit is exceeded.

25. The invention according to claim 22 wherein said third operative means includes means for calculating a maximum torque level to be established by said clutch means and means for programming clutch torque application over a predetermined period of time.

26. The invention according to claim 25 wherein said calculating means comprises first means for computing and generating an output indicative of total torque delivered to said transfer case, which output is received at a second means which sets a maximum controlled level of torque to be imparted to the clutch and which is determined as a computed function of the total torque delivered to the transfer case.

27. The invention according to claim 26 wherein said first means receives a plurality of inputs including an input indicative of engine torque, an input indicative of engine speed, an input indicative of the rotational speed of said front drive shaft, and an input indicative of the rotational speed of said rear drive shaft.

28. The invention according to claim 27 wherein said engine includes a positionable throttle and said first means for computing and generating an output indicative of total torque delivered to said transfer case also receives an input indicative of the position of the engine throttle.

29. The invention according to claim 25 wherein said means for programming clutch torque application over a predetermined period of time responds to wheel slip indications from either said first or second operative means.

30. The invention according to claim 29 wherein said means for programming clutch torque application permits clutch application to include a predetermined rise phase extending to a maximum target level set by the third operative means, a target hold phrase during which clutch application is maintained at a substantially constant maximum target level for a predetermined time, and a predetermined return phase during which clutch application will be reduced from the maximum target level to its initial level.

31. The invention according to claim 30 wherein said means for programming clutch torque application over a predetermined period of time is inhibited from receiving wheel slip indications during the predetermined rise phase of said clutch application.

32. The invention according to claim 22 further including fourth operative means connected to said means for programming clutch torque application for applying current levels to the electromagnetically actuated clutch assembly to produce the torque called for by the third operative means.

33. The invention according to claim 32 wherein the current level applied by said fourth operative means are effected by the transfer case fluid temperature level.

34. In combination with a four wheel drive vehicle having front and rear pairs of wheels driven by an engine, and a steering mechanism for effecting the steering angle of at least one pair of the front and rear wheels, a system for biasing torque to all four wheels of said vehicle comprising:

a fluid containing transfer case connected to said engine for operatively transmitting input power and torque to all four wheels of said vehicle, said transfer case including front and rear drive shafts and a gear arrangement defining a first driving connection which interconnects said drive shafts in a manner such that input torque to the transfer case is divided between said shafts in a ratio fixed by the gear arrangement;

a clutch assembly operatively connected with said transfer case for defining a second driving connected between said drive shafts and arranged such that torque may be shifted between said shafts, said clutch assembly including interleaved friction members some of which turn with the front drive shaft with the remaining members turning with the rear drive shaft and an electromagnetic energizer for modulating the torque level between said friction members as a function of a control command applied to said energizer;

first operative means for establishing whether acceleration of said front drive shaft exceeds a predetermined limit and for generating a wheel slip indication when said predetermined limit is exceeded;

second operative means for establishing whether acceleration of said rear drive shaft exceeds a predetermined limit and for generating a wheel slip indication when said predetermined limit is exceeded;

third operative means for detecting a relative slip condition between said front and rear drive shaft and developing a wheel slip indication when said slip condition exceeds a predetermined limit; and control means connected to said electromagnetic energizer and responsive to an indication of wheel slip from either said first, second or third operative means for regulating the level of torque to be established between said friction members to correct for wheel slip.

35. The system of claim 34 wherein said first operative means includes means for receiving a plurality of inputs including a first input indicative of front drive shaft acceleration and a second input indicative of a predetermined allowable upper acceleration limit, processing those inputs, and producing a wheel slip indication when said predetermined upper acceleration limit is exceeded.

36. The system of claim 34 wherein said second operative means includes means for receiving a plurality of inputs including a first input indicative of rear drive axle acceleration and a second input indicative of a predetermined allowable upper acceleration limit, processing those inputs, and producing a wheel slip indication when said predetermined upper acceleration limit is exceeded.

37. The invention according to claim 34 wherein said third operative means includes means for initially receiving a plurality of inputs including a first input indicative of front drive shaft rotational speed and a second input indicative for processing those inputs against each other and producing a wheel slip indication when said two inputs exceed a predetermined limit.

38. The invention according to claim 37 wherein said means for initially receiving a plurality of inputs receives a third input indicative of the present steering angle, which third input is processed with said first and second inputs by said processing means.

39. The invention according to claim 34 wherein said control means includes means for calculating a maximum torque level to be established by said clutch means and means for programming clutch torque application over a predetermined period of time.

40. The invention according to claim 39 wherein said calculating means comprises first means for computing and generating an output indicative of total torque delivered to said transfer case, which output is received at a second means which sets a maximum controlled level of torque to be imparted to the clutch and which is determined as a computed function of the total torque delivered to the transfer case.

41. The invention according to claim 40 wherein said first means receives a plurality of inputs including an input indicative of engine torque, an input indicative of engine speed, an input signal indicative of the rotational speed of said front drive shaft, and an input indicative of the rotational speed of said rear drive shaft.

42. The invention according to claim 41 wherein said engine includes a positionable throttle and said input indicative of engine torque is derived from inputs indicative of throttle position and engine speed.

43. The invention according to claim 42 further including fifth operative means connected to said means for programming clutch torque application for applying current to the electromagnetic energizer of said clutch assembly to provide the torque called for by the control means.

44. The invention according to claim 43 wherein the current applied by said fifth operative means is effected by the transfer case fluid temperature level.

45. The invention according to claim 39 wherein said means for programming clutch torque application over a predetermined period of time is responsive to wheel slip indications from one of said first, second and third operative means.

46. The invention according to claim 45 wherein the means for programming clutch torque application permits clutch application to include a predetermined rise phase extending to a maximum target level set by the calculating means, a torque hold phase during which clutch application is maintained at a substantially constant maximum torque level for a predetermined time, and a predetermined return phase during which clutch application will be reduced to its initial level.

47. The invention according to claim 46 wherein said means for programming clutch torque application over a predetermined period of time is inhibited from receiving wheel slip indications during the predetermined rise phase of said clutch application.

48. A method for controlling a steerable four wheel drive vehicle having an operator controlled engine, front and rear drive axles and a transfer case connected to the engine, said transfer case including a planetary gear differential controlled by an electromagnetic clutch for biasing torque between the front and rear drive axles, said method comprising the steps of:
sensing front and rear drive axle speeds;
sensing the steering angle of the vehicle;
detecting a slip condition between front and rear drive axles utilizing the sensed speeds and present steering angle, and developing a first output indicative of a slip condition;
computing total torque delivered to said transfer case;
developing a second output in response to an indication of a slip condition and as a function of total torque delivered to said transfer case, said output being indicative of a level of torque required to be developed by said clutch to correct the detected slip condition, and controlling application of the electromagnetic clutch with said output for a predetermined time period and in a manner biasing torque between the front and rear drive axles.

49. The method of claim 48 comprising the additional step of:
inhibiting application of the electromagnetic clutch when said first output is developed again prior to termination of a predetermined period of time.

50. A method for controlling a steerable four wheel drive vehicle having an operator controlled engine, front and rear drive shafts and a transfer case connected to the engine with an electromagnetically clutch controlled planetary gear differential for biasing torque between the front and rear drive shafts said method comprising the steps of:
comparing shaft acceleration rates of said front and rear drive shafts against predetermined limits and developing wheel a slip indication if either or both shaft acceleration rate exceed said predetermined limits.

51. A system for distributing torque to all four drive wheels of a vehicle including front and rear drive axles and an engine, said system comprising:
a transfer case connected to said engine and including an input shaft connected to said front and rear drive axles, said transfer case further including a differential for interconnecting said input shaft with the front and rear drive axles so as to transmit torque therefrom to both of said front and rear drive axles in a predetermined manner;
modulatable biasing clutch means operatively connected with the transfer case and including an electromagnetically actuated clutch assembly with an energizeable magnetic coil, said clutch assembly operative to redistribute the input torque to the transfer case in accordance with the energization of the magnetic coil so as to alter the torque split from a nominal value established by the differential to an adjusted value for improving traction and vehicle handling conditions;
means including sensor means for producing signals indicative of vehicle operating conditions including vehicle speed and front and rear drive shaft speeds; and characterized by controller means for receiving and analyzing the vehicle operating conditions for producing a desired slip speed setpoint signal which is a function of the vehicle operating conditions;

feedback control loop means including means for comparing the actual slip speed relationship between the speed of the front drive shaft and the speed of the rear drive shaft with the desired slip speed setpoint signal to establish a slip speed error signal; and switch logic means operative when the slip speed error signal is above a predetermined upper limit to produce a maximum clutch command signal and operative when the slip speed error signal is below a lower limit to produce a zero clutch energization signal.

52. The system of claim 51, characterized by means for providing a feed forward signal of engine operating conditions and modulating the clutch command signal to increase the average of the clutch torque if the vehicle operating conditions are in a direction to increase the actual slip speed difference between the front and rear drive shafts and to decrease the average if the vehicle operating conditions are in a direction to reduce the actual slip speed difference between the front and rear drive shafts.

53. The system of claim 51 wherein the switch logic means includes means producing a limit cycle control signal.

54. The system of claim 51 characterized by the switch logic means being operative to produce a limit cycle control signal which has a frequency determined by the overall system.

55. The system of claim 54, characterized by said switch logic means producing a limit cycle control signal whose frequency is determined in part by operation of said electromagnetically actuated clutch assembly.

56. A system for distributing torque to all four drive wheels of a vehicle including front and rear drive axles and an engine, said system comprising:

a transfer case connected to said engine and including an input shaft connected to said front and rear drive axles, said transfer case further including a differential for interconnecting said input shaft with the front and rear drive axles so as to transmit torque therefrom to both of said front and rear drive axles in a predetermined manner;

modulatable biasing clutch means operatively associated with the transfer case and including an electromagnetically actuated clutch assembly with an energizeable magnetic coil, said clutch assembly operative to redistribute the input torque to the transfer case in accordance with the energization of the magnetic coil so as to alter the torque split from a nominal value established by the differential to an adjusted value for improving traction and vehicle handling conditions;

means including sensor means for producing signals indicative of vehicle operating conditions including vehicle speed and front and rear drive shaft speeds; and characterized by controller means for receiving and analyzing the vehicle operating conditions for producing a desired slip speed setpoint signal which is a function of the vehicle operating conditions; and feedback control loop means for producing a feedback signal of the actual slip speed relationship between the speed of the front drive shaft and the speed of the rear drive shaft and means for producing control of the energization of the magnetic coil based on said feedback signal.

57. The system of claim 56, characterized by means for providing a feed forward signal of engine operating conditions and modulating the clutch command signal to increase the average of the clutch torque if the vehicle operating conditions are in a direction to increase the actual slip speed difference between the front and rear drive shafts and to decrease the average if the vehicle operating conditions are in a direction to reduce the actual slip speed difference between the front and rear drive shafts.

58. The system of claim 56, characterized by the means of producing control of energization of the magnetic coil including means producing a limit cycle control signal.

59. The system of claim 58, characterized by the switch logic means being operative to produce a pulse width determined by the overall system dynamics.

60. The system of claim 56, characterized by the means for producing control of energization of the magnetic coil including switch logic means for controlling modulating pulse width based on said feedback signal.

61. The system of claim 56, characterized by the means for producing control of energization of the magnetic coil including proportional integrated differentiation of said feedback signal.

62. A system for distributing torque to all four drive wheels of a vehicle powered by an engine, said system comprising:

a transfer case connected to said engine and having an input shaft connected to front and rear drive axles, said transfer case further including a differential for interconnecting said input shaft with the front and rear drive axles such that torque is transmitted to both of said drive axles in a predetermined manner;

control system means including sensor means for monitoring drive axle rotational speeds and engine operating conditions, wheel slip detector means for detecting a slip condition between said front and rear drive axles and for generating an output, clutch torque command generator means responsive to the output of said wheel slip detector means for calculating and generating a target torque level output which is computed as a function of total torque delivered to said transfer case and delivered to a clutch actuator means;

said clutch torque command generator means including means for increasing the torque level to the target torque level over a predetermined time period and then maintaining the torque level generally constant for a second predetermined time period; and modulatable biasing clutch means operatively connected with the transfer case and including an electromagnetically actuated clutch assembly with friction members which are operably effective to interconnect two members of said differential, wherein said clutch actuator means regulates the electromagnet clutch assembly in a manner controlling the operable effectiveness of said clutch assembly and thereby controlling torque transmission to the front and rear drive axles as a function of a torque level established between said friction members.

* * * * *